US011389960B2

(12) United States Patent
Chae

(10) Patent No.: US 11,389,960 B2
(45) Date of Patent: Jul. 19, 2022

(54) SYSTEMS AND METHODS FOR ROBOTIC PROCESS AUTOMATION

(71) Applicant: Argos Labs Inc., San Jose, CA (US)

(72) Inventor: Moon Chang Chae, Seoul (KR)

(73) Assignee: Argos Labs Inc., San Jose, CA (US)

( * ) Notice: Subject to any disclaimer, the term of this patent is extended or adjusted under 35 U.S.C. 154(b) by 0 days.

(21) Appl. No.: 16/898,324

(22) Filed: Jun. 10, 2020

(65) Prior Publication Data
US 2020/0387358 A1     Dec. 10, 2020

Related U.S. Application Data

(60) Provisional application No. 62/859,608, filed on Jun. 10, 2019.

(51) Int. Cl.
G06F 9/44 (2018.01)
B25J 9/16 (2006.01)
B25J 13/06 (2006.01)
G06F 8/36 (2018.01)
G06F 8/40 (2018.01)
(Continued)

(52) U.S. Cl.
CPC ............ B25J 9/1658 (2013.01); B25J 9/161 (2013.01); B25J 9/1671 (2013.01); B25J 13/06 (2013.01); G06F 8/36 (2013.01); G06F 8/40 (2013.01); G06F 9/44526 (2013.01); G06F 9/44589 (2013.01); G06F 9/455 (2013.01)

(58) Field of Classification Search
CPC ........ B25J 9/1658; B25J 9/161; B25J 9/1671; B25J 13/06; G06F 8/36; G06F 8/40; G06F 9/44526; G06F 9/44589; G06F 9/455

USPC .......................................................... 717/122
See application file for complete search history.

(56) References Cited

U.S. PATENT DOCUMENTS 7,653,873 B2   1/2010  Brandt
2008/0313549 A1* 12/2008  Stoyanov ................ G06F 9/452
                                                    715/749

(Continued)

FOREIGN PATENT DOCUMENTS

EP         3206170 A1    8/2017
KR   10-2013-0057628 A1  6/2013

OTHER PUBLICATIONS

Title: Generation and validation of virtual point cloud data for automated driving systems, author: T Hanke et al, Published on 2017, source: IEEE.*

(Continued)

*Primary Examiner* — Chameli Das
(74) *Attorney, Agent, or Firm* — David R. Stevens; Stevens Law Group

(57) ABSTRACT

Example robotic process automation systems and methods are described. In one implementation, a processing system receives a first automation scenario, where the first automation scenario is for execution by the processing system. The processing system identifies a list of plugins in the first automation scenario and identifies a version number associated with each of the plugins in the first automation scenario. Additionally, the processing system verifies the list of plugins and their associated version numbers. If the list of plugins and their associated version numbers are verified, the processing system builds a first virtual environment for the plugins in the first automation scenario.

14 Claims, 18 Drawing Sheets

(51) Int. Cl.
*G06F 9/445* (2018.01)
*G06F 9/455* (2018.01)

(56) References Cited

U.S. PATENT DOCUMENTS

| | | | | |
|---|---|---|---|---|
| 2010/0146085 | A1* | 6/2010 | Van Wie | H04L 67/1059 709/220 |
| 2010/0229169 | A1* | 9/2010 | Bunnell | G06F 9/455 718/1 |
| 2012/0233668 | A1* | 9/2012 | Leafe | G06F 9/00 726/4 |
| 2013/0042188 | A1* | 2/2013 | Dobronsky | G06F 3/0482 715/760 |
| 2013/0138596 | A1 | 5/2013 | Kim et al. | |
| 2013/0246932 | A1* | 9/2013 | Zaveri | G06F 3/04815 715/740 |
| 2016/0350438 | A1* | 12/2016 | Kreiner | G06F 40/143 |
| 2017/0054793 | A1* | 2/2017 | Urbach | H04L 69/03 |
| 2017/0269972 | A1* | 9/2017 | Hosabettu | G06F 9/4843 |
| 2018/0197123 | A1 | 7/2018 | Parimelazhagan et al. | |
| 2018/0210745 | A1* | 7/2018 | Raheja | G06F 9/5077 |
| 2018/0276009 | A1* | 9/2018 | Williams | G06F 9/44526 |
| 2019/0235883 | A1* | 8/2019 | Chaney | G06F 8/71 |
| 2020/0073692 | A1* | 3/2020 | Rao | G06F 9/45558 |
| 2020/0117677 | A1* | 4/2020 | Janyavula | G06F 16/2456 |
| 2020/0133827 | A1* | 4/2020 | Tkac | G06F 9/455 |

OTHER PUBLICATIONS

Title: Automating application deployment in infrastructure clouds, author: G Juve et al, published on 2011.*
Title: Test confessions: A study of testing practices for plug-in systems, author M Greiler,, published on 2012.*
Title: Quicktime VR: An image-based approach to virtual environment navigation, author: SE Chen, published on 1995.*
Title: Automated discovery and maintenance of enterprise topology graphs; author: T Binz,; Published on 2013.*

* cited by examiner

SYSTEMS AND METHODS FOR ROBOTIC PROCESS AUTOMATION

RELATED APPLICATION

This application also claims the priority benefit of U.S. Provisional Application Ser. No. 62/859,608, entitled "Systems and Methods for Robotic Process Automation," filed Jun. 10, 2019, the disclosure of which is incorporated by reference herein in its entirety.

TECHNICAL FIELD

The present disclosure relates to systems and methods related to various types of software robots for business processes.

BACKGROUND

Software robots for business processes (Bots), also referred to Robotic Process Automation (RPA), are viewed as an essential element in digital transformation efforts by enterprises worldwide, along with other technologies such as Artificial Intelligence (AI) and Machine Learning (ML). Bots are expected to relieve humans from tedious and repetitive manual tasks, and boost productivity for companies.

However, the market and technology are still young and in the developing phase. The need for extensive consultation has generally limited the availability of RPA to Fortune 500 class enterprises. Further, today's RPA solutions typically require specially trained engineers to develop, deploy, and maintain the Bots. These limitations result in a high cost of RPA deployment and in failures when viewed from an ROI (Return On Investment) standpoint.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
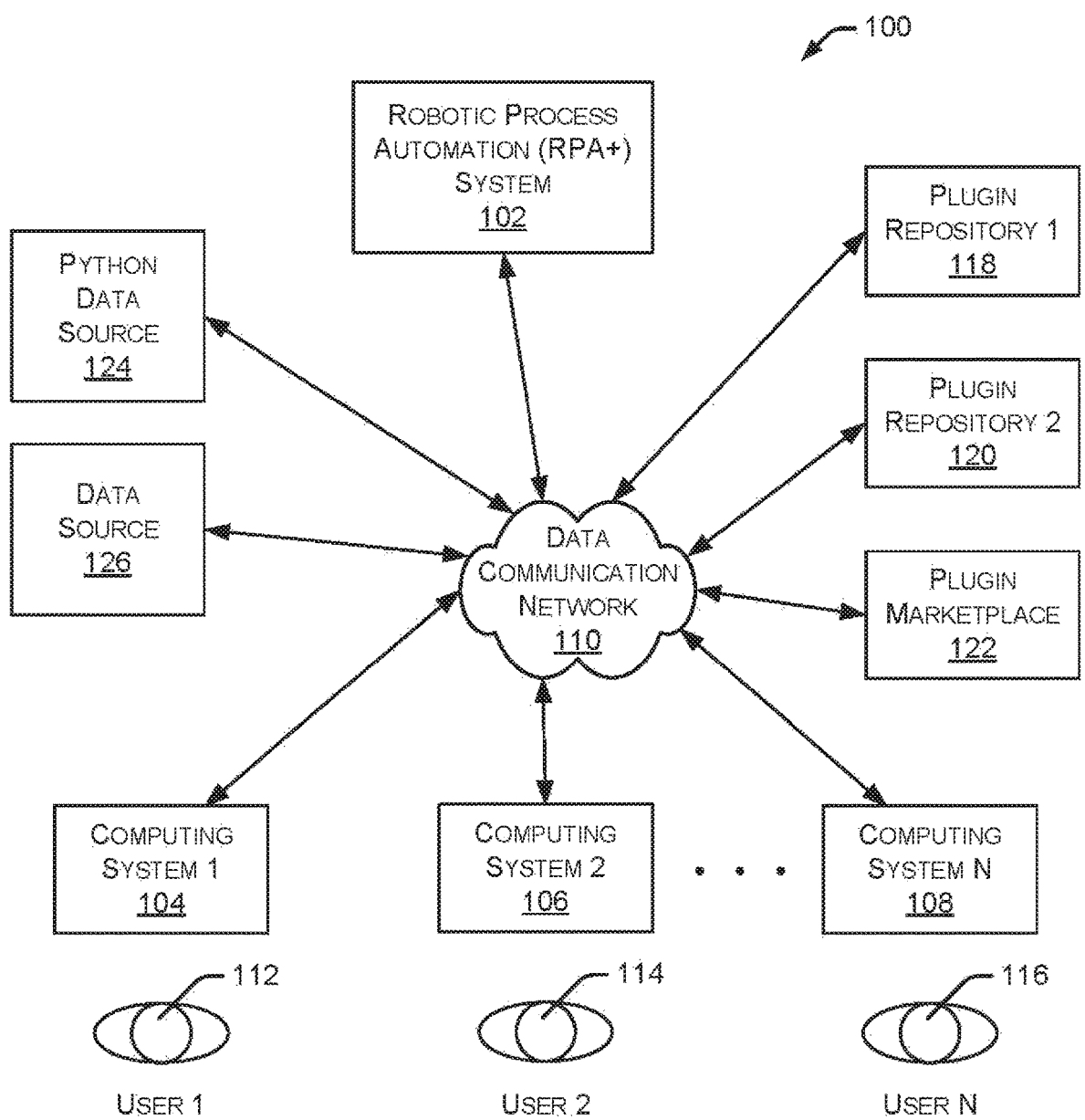
FIG. 1 is a block diagram illustrating an environment within which an example embodiment may be implemented.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The systems and methods discussed herein represent a new type of RPA platform, referred to herein as RPA+. This new RPA+ platform is based on a low-to-zero coding philosophy. This platform provides a GUI (Graphical User Interface)-based system for building Bots. RPA+ supports both auto-recording and building block approaches. The tools are intuitive to the extent that anyone who can make a PowerPoint presentation can also build Bots without much difficulty. Furthermore, RPA+ includes a set of tools that automatically converts PYTHON programs into building blocks that users can use to develop their Bots.

As used herein, a Bot refers to an automation scenario that may operate with a Process Automation Module (PAM). The automation scenario is a group of operations put together by a Scenario Studio (STU). Operations refer to the building blocks of the automation scenario and may include basic operations and plugin operations in the STU toolbox. Plugins refer to operations that are built using the PYTHON-to-operation tools (POT) software development kit (SDK). The POT SDK converts PYTHON programs to operations and stores them in one or more repositories. Repositories provide a storage location for plugins. Repositories may be public repositories or private repositories. A public repository is available to many users (e.g., Bot builders) and may also have features to function as a plugin Marketplace. A plugin Marketplace is a place where users can trade plugins (i.e., building blocks for Bots).

PYTHON is a programming language used for a variety of applications. PYTHON is a fast growing programming language and is broadly used for AI/ML as well as automation projects. As described herein, a new RPA+ PYTHON plugin architecture allows organizations throughout the world to immediately take advantage of the enormous amount of PYTHON resources that are already available. With the systems and methods described herein, it becomes possible to easily implement the modular approach provided by RPA+ to create Bots. As described in greater detail below, this system also provides substantial opportunities to the entire PYTHON community worldwide. For example, a PYTHON repository maintained by ARGOS LABS or other entities may form a basis for a plugin marketplace that makes it possible to buy and sell Bot components (e.g., plugins) between PYTHON coders and Bot builders.

The systems and methods described herein illustrate example implementations of the RPA+ PYTHON plugin architecture. These systems and methods also define RPA+ as not just an RPA platform, but as another evolution in the history of the software programming platform. Essentially, RPA is an alternative to conventional system development methodologies. The concept of RPA emerged because it promised ease of deployment and ROI substantially better than the then existing traditional methods for system development. However, many RPA projects have fallen short of their promises. Two typical problems for failures are a substantial requirement for consultation work even before starting to build Bots, and a burdensome requirement for specially trained professionals to build and maintain Bots. As described herein, RPA+ overcomes the limitations of traditional RPA approaches.

As mentioned above, there are two main difficulties associated with traditional RPA methodologies. The first issue, the need for massive consultations, seems to be addressed by AI. Thanks to technological advancement, many companies around the world are proposing AI-based "process discovery automation" to circumvent this limitation. The second difficulty is the need for trained professionals to build and maintain Bots. This issue is critical as it directly impacts a return on investment (ROI). As specialists are more expensive than generalists, the RPA+ platform discussed herein has been designed to enable generalist, or even non-IT workers, to build and maintain Bots. In this way, the RPA+ platform addresses this second limitation.

FIG. 1 is a block diagram illustrating an environment 100 within which an example embodiment may be implemented. As shown in FIG. 1, a robotic process automation (RPA+) system 102 and multiple computing systems 104, 106, and 108 are coupled to a data communication network 110. Additionally, a first plugin repository 118, a second plugin repository 120, and a plugin marketplace 122 are coupled to data communication network 110. Plugin repositories 118 and 120 may each be public plugin repositories or private plugin repositories, as discussed herein. Although two plugin repositories 118 and 120 are shown in FIG. 1, alternate embodiments of environment 100 may include any number of plugin repositories.

A plugin marketplace 122 is another type of plugin repository that is accessible by a variety of users, as discussed in greater detail below. Although one plugin marketplace 122 is shown in FIG. 1, alternate embodiments of environment 100 may include any number of plugin marketplaces maintained by any number of individuals or entities. As shown in FIG. 1, any number of users 112, 114, and 116 may access (via computing systems 104, 106, and 108) RPA+ system 102 as well as plugin repositories 118, 120 and plugin marketplace 122. FIG. 1 also illustrates a PYTHON data source 124 and another data source 126. The other data source 126 may include a source of any type of data, such as JavaScript, PHP (Hypertext Preprocessor), Ruby, Perl, Lisp, R, and Forth.

Data communication network 110 includes any type of network topology using any communication protocol. Additionally, data communication network 110 may include a combination of two or more communication networks. In some embodiments, data communication network 110 includes a cellular communication network, the Internet, a local area network, a wide area network, or any other communication network. Computing systems 104, 106, and 108 may include any type of computing device, such as a desktop computer, a laptop computer, a mobile device, a microprocessor-based or programmable consumer electronic device, a network PC, a minicomputer, a mainframe computer, a PDA, a smartphone, a tablet, and the like. As discussed herein, users interact with a particular computing system 104, 106, and 108, to enter and select information to create and deploy Bots. In the example of FIG. 1, a first user 112 interacts with computing system 104, a second user 114 interacts with computing system 106, and a third user 116 interacts with computing system 108. Although three computing systems 104, 106, and 108 and three users 112, 114, and 116 are shown in FIG. 1, alternate embodiments may include any number of computing systems and any number of users interacting with the computing systems.

In some embodiments, RPA+ system 102 and computing systems 104, 106, and 108 are each located in a different geographic location. For example, RPA+ system 102 may be located at a first geographic location associated with a business and each computing system 104, 106, and 108 is located at a different geographic location associated with a user's current location. In other embodiments, computing systems 104, 106, and 108 may be located in the same geographic location, such as the same building, campus, and the like. In particular implementations, RPA+ system 102 and computing systems 104, 106, and 108 are located in the same geographic location or a similar geographic area.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
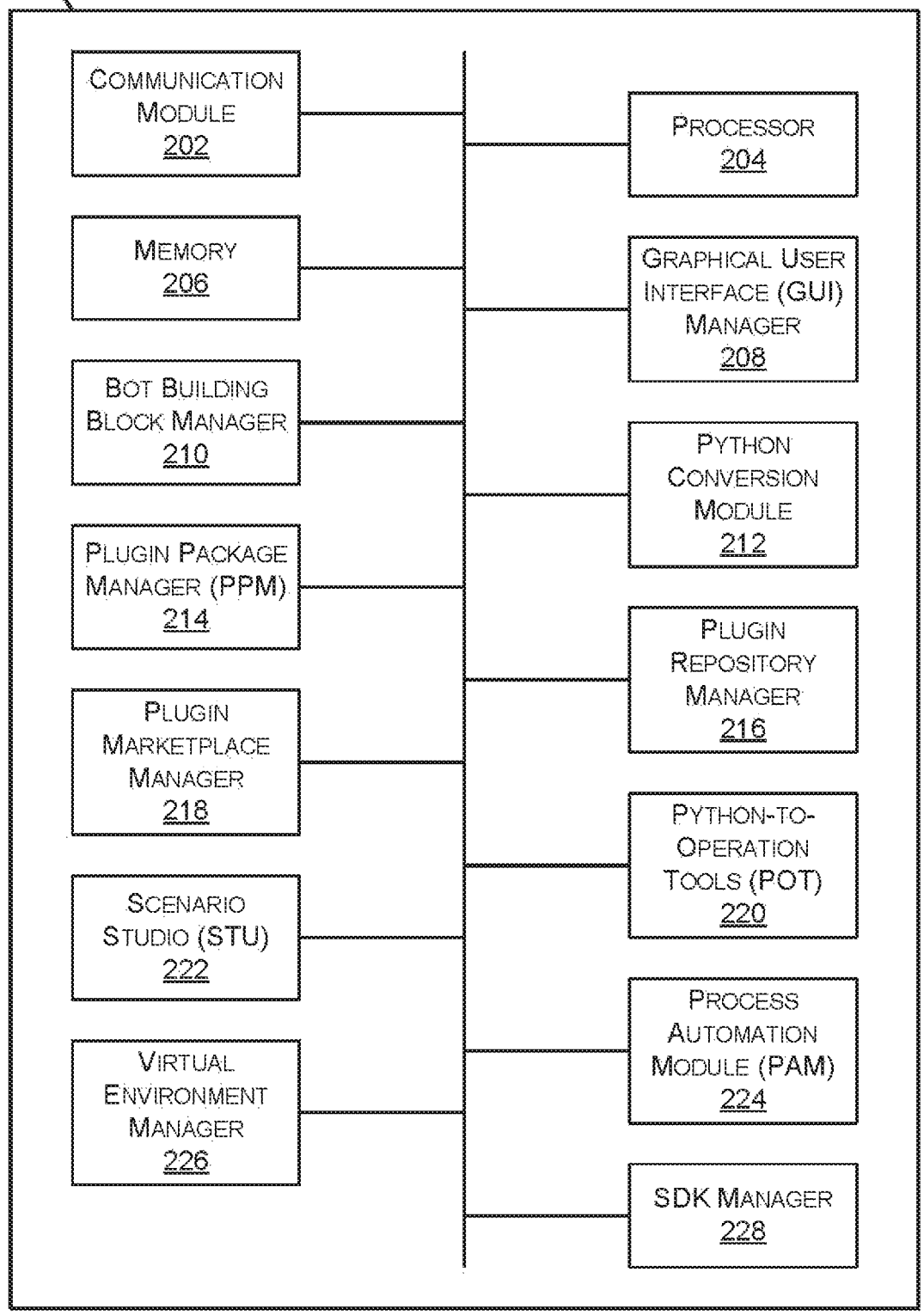
FIG. 2 is a block diagram illustrating an embodiment of an improved robotic process automation (RPA+) system.

FIG. 2 is a block diagram illustrating an embodiment of an improved robotic process automation (RPA+) system 102. As shown in FIG. 2, RPA+ system 102 includes a communication module 202, a processor 204, and a memory 206. Communication module 202 allows RPA+ system 102 to communicate with other systems, such as computing systems 104-108, plugin repositories 118 and 120, plugin marketplace 122, PYTHON data source 124, data source 126, and the like. Processor 204 executes various instructions to perform the functionality provided by RPA+ system 102, as discussed herein. Memory 206 stores these instructions as well as other data used by processor 204 and other modules and components contained in RPA+ system 102.

Additionally, RPA+ system 102 includes a graphical user interface (GUI) 208 that manages, generates, and modifies various user interfaces, as discussed herein. A Bot building block manager 210 manages the various building blocks used by RPA+ system 102 to generate Bots that perform a variety of activities. A PYTHON conversion module 212 converts PYTHON code into plugins used by RPA+ system 102 to create Bots, as described herein.

RPA+ system 102 also includes a plugin package manager (PPM) 214. PPM 214 is a tool that communicates with various plugin repositories to get user-dependent plugin lists and specifications for appropriate plugins. A plugin repository manager 216 handles identification and access to various plugin repositories used to obtain and build various types of Bots. Similarly, a plugin marketplace manager 218 handles identification and access to various plugins available in a plugin marketplace.

RPA+ system 102 further includes PYTHON-to-operation tools (POT) 220, which may test and qualify plugin modules before adding the plugin to a repository. For example, the POT 220 may check plugin modules for functionalities and security before allowing the plugin to be included in a particular repository. After a Bot has been built with plugins, a scenario studio (STU) 222 packages the Bot into a file and provides it to a process automation module (PAM) 224. The PAM 224 uses its own PPM 214 to identify the plugins being used in a specific Bot and asks for the plugin package which contains the original PYTHON script.

Additionally, RPA+ system includes a virtual environment manager 226, which manages various virtual environments in which Bots may be created and/or executed. A software development kit (SDK) manager 228 handles the distribution of the SDK and updating information contained in the SDK.

Figure 3:
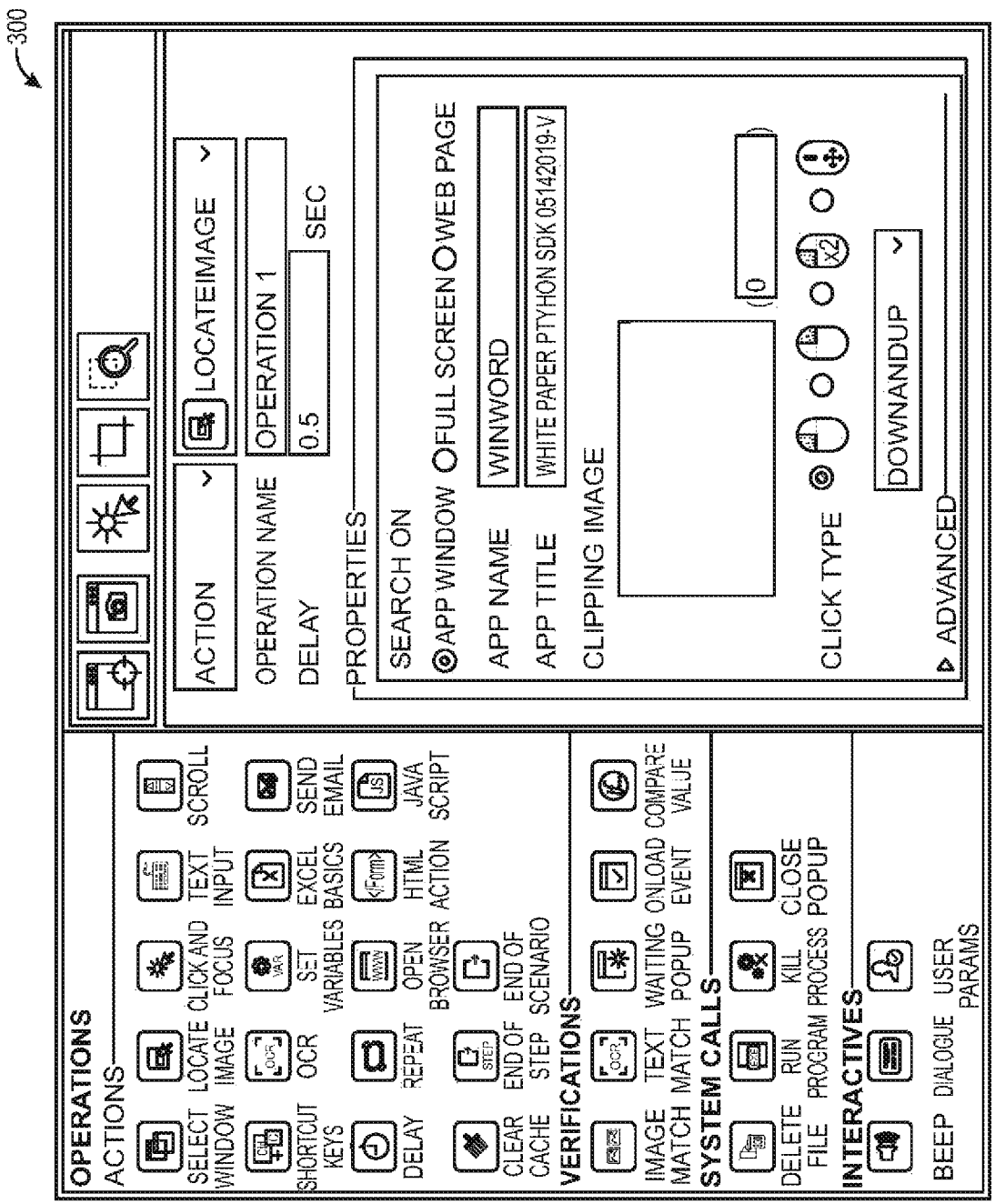
FIG. 3 illustrates an embodiment of an RPA+ graphical user interface (GUI).

FIG. 3 illustrates an embodiment of an RPA+ graphical user interface (GUI) 300. For example, FIG. 3 depicts building blocks and parameter settings associated with an RPA+ GUI screen. When a user is developing a Bot with RPA+, the user chooses these building blocks and sets the appropriate parameters. In various embodiments, the system may provide any number of building blocks. In some situations, a complex Bot can be built just by combining the example building blocks shown in FIG. 3.

In some embodiments, GUI 300 includes a toolbox (shown on the left side of FIG. 3) that includes a variety of operations. For example, these operations may include basic operations as well as plugins, as discussed herein. A user who is building a Bot can select any number of operations from the toolbox and add them to a timeline, such as dragging and dropping an icon associated with the operation to the timeline. The operations are entered in the timeline in the desired order of execution. The user then sets various parameters associated with the selected operations. These parameters may include, for example, a return value produced by the operation, a result type, a variable name, and other parameters or properties. For example, the right side of FIG. 3 displays parameters and settings for a Locate Image operation.

By combining multiple building blocks, a Bot builder can create a Bot that performs a wide variety of functions. Particular Bots can access data, generate data, interact with human users, interact with remote systems, analyze data, generate audio data, generate video data, create and sent messages (e.g., text messages, email messages, and voicemail messages), and the like.

Figure 4:
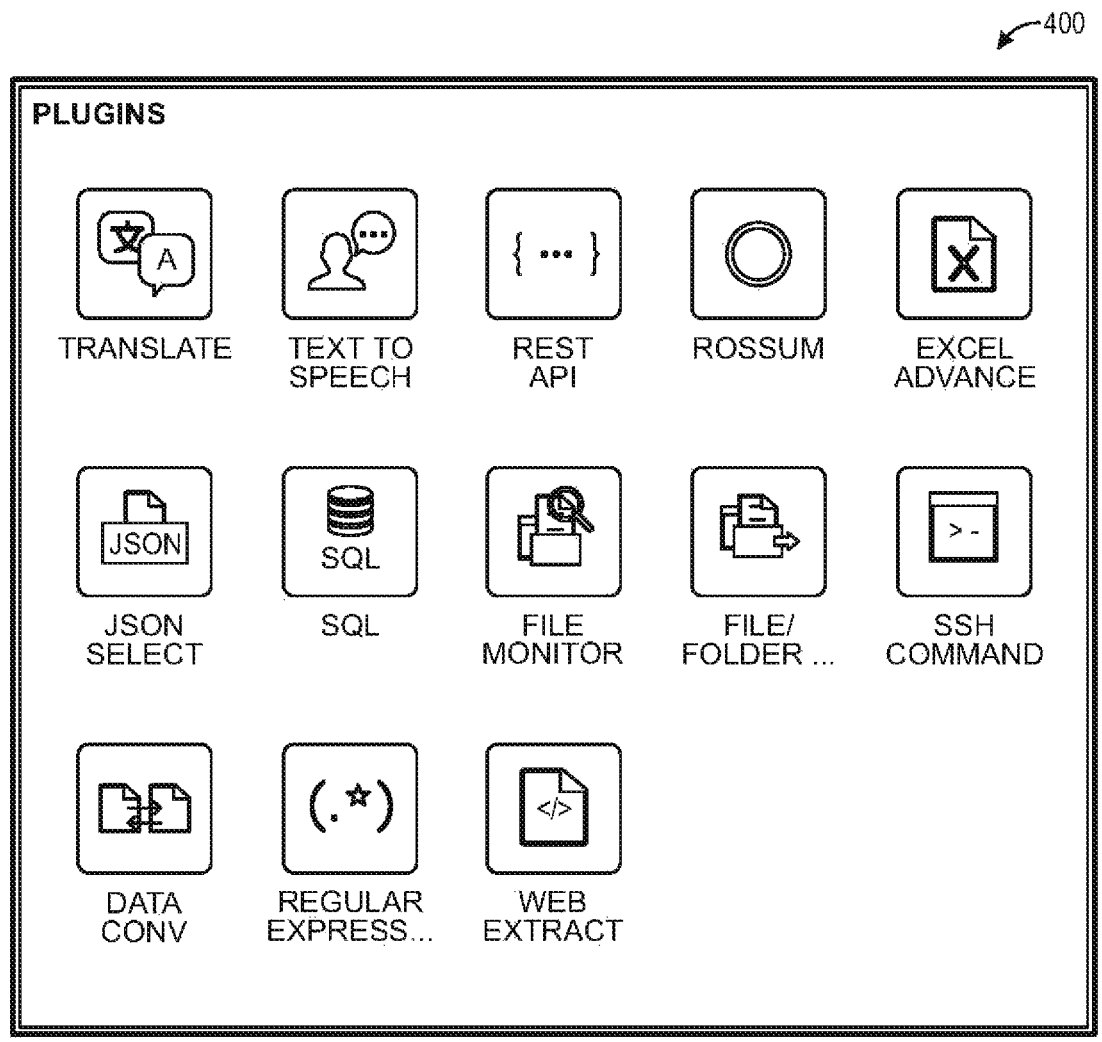
FIG. 4 illustrates an embodiment of a plugin module used with the RPA+.

FIG. 4 illustrates an embodiment of a plugin module 400 used with RPA+. To implement more complex designs, a PYTHON plugin architecture provides additional building blocks, as shown in FIG. 4. The plugin module offers more advanced options, such as JSON and SQL commands, to a developer. In the example of FIG. 3, RPA+ provides 31 basic modules, while other more complex features are implemented as plugins. The users can choose from a repository (e.g., a marketplace) maintained by ARGOS Labs or another entity. In some embodiments, the repository includes a library of plugins that allows a user to automate their specific business processes.

The basic architecture of the plugin modules is designed to be directly converted from, for example, PYTHON programs. PYTHON is a popular programming language used to develop automation modules, and for AI/ML systems. A large number of PYTHON modules are available from public repositories. Thus, Bot builders have instantaneous access to tens of thousands of functionalities. Bot builders can also pick and add only the tools they need. These tools can be very specific to functions and target systems. The flexibility provided to Bot builders allows the builders with unique requirements to create a diverse set of functional plugins. This allows RPA+ to function with a core set of building blocks and support additional functionality being added using plugins. Based on this architecture, the PYTHON plugin is a more efficient approach than other solutions that must offer 400 or more tools to support all potential functionality.

In some embodiments, RPA+ can be adapted to function on different operating systems such as Windows, macOS, different versions of Linux, and so on, on a single Bot development platform. Mobile device operating systems such as Android and iOS can also be supported. A PYTHON plugin associated with RPA+, as discussed herein, provides additional functionality to RPA+. This system incorporates sufficient abstraction to use different kinds of application programming interfaces (APIs), thereby allowing the architecture to leverage an ever-growing community of software developers from different markets.

Figure 5:
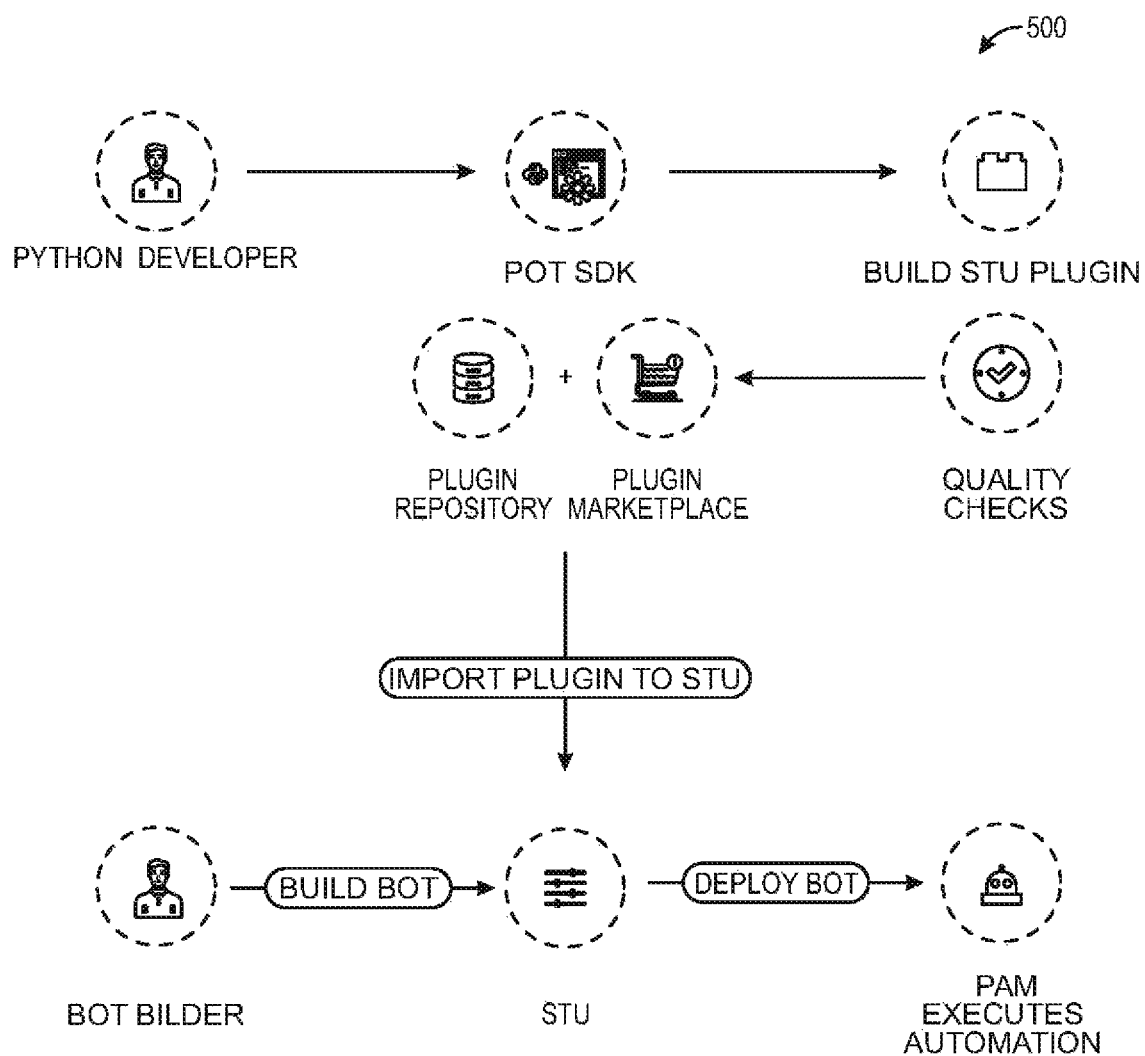
FIG. 5 illustrates an embodiment of a flow diagram for creating and implementing a plugin module.

FIG. 5 illustrates an embodiment of a flow diagram 500 for creating and implementing a plugin module. The RPA+ PYTHON plugin architecture includes a PYTHON coder (or PYTHON developer). As shown in FIG. 5, the PYTHON coder first aligns the format of the code according to a Software Development Kit (SDK) associated with RPA+ and the PYTHON plugin architecture. In some embodiments, the SDK also includes templates, sample codes, utilities, and documentation. Then, by uploading the code to the PYTHON-to-operation tools (POT), which is a backstage like private repository for pre-qualified PYTHON modules, the plugin modules are automatically generated after checking for functionalities and security.

The plugin module and the original PYTHON code are stored in the marketplace and the repository, respectively. Then, as a Bot builder searches the building block that serves his/her Bot requirements for a specific project, they can just visit the marketplace, choose the ideal building block, and bring it in as a part of the Scenario Studio (STU) which they use to build Bots with zero-coding technology.

Finally, when the Bot has been built, the Bot builder dispatches the Bot to a Process Automation Module (PAM). PAM sees the Bot containing the PYTHON plugin and it goes to the repository and retrieves the original PYTHON code for PAM to execute. In some embodiments, PAM has a built-in PYTHON interpreter.

Some examples of plugins that can be included in a Bot design are:

1) Online tools such as Rossum can be integrated into a Bot by writing simple PYTHON code to call their API. In one instantiation, integration of this design takes approximately three hours to accomplish.

2) Publicly available tools like Google Translate, which is written in PYTHON can be integrated into a Bot just by processing through the SDK and POT.

3) Existing PYTHON assets inside an organization can all be included as building blocks for Bots by the SDK and POT. These building blocks (plugins) can be stored in either private or public repositories and become available to those who have access to the repository. For example, a Bot coder who builds a new plugin module can decide whether to make the plugin module only available in their own environment (private) or available for others to use (public).

In some embodiments, the SDK and POT architecture can be implemented using languages other than PYTHON, such as JavaScript (that possesses a similar implementation as PYTHON using node.js and npm), GO (useful for both backend logic as well as command line interface-CLI-utilities such as docker), C #, and so on. In order to implement plugins in languages other than PYTHON, the associated PYTHON code is ported into the desired target language for the SDK and POT utility. The plugin repository is correspondingly extended to support the plugins generated using these programming languages. In this way, the functionality of RPA+ can be extended to support a variety of different languages.

Figure 6:
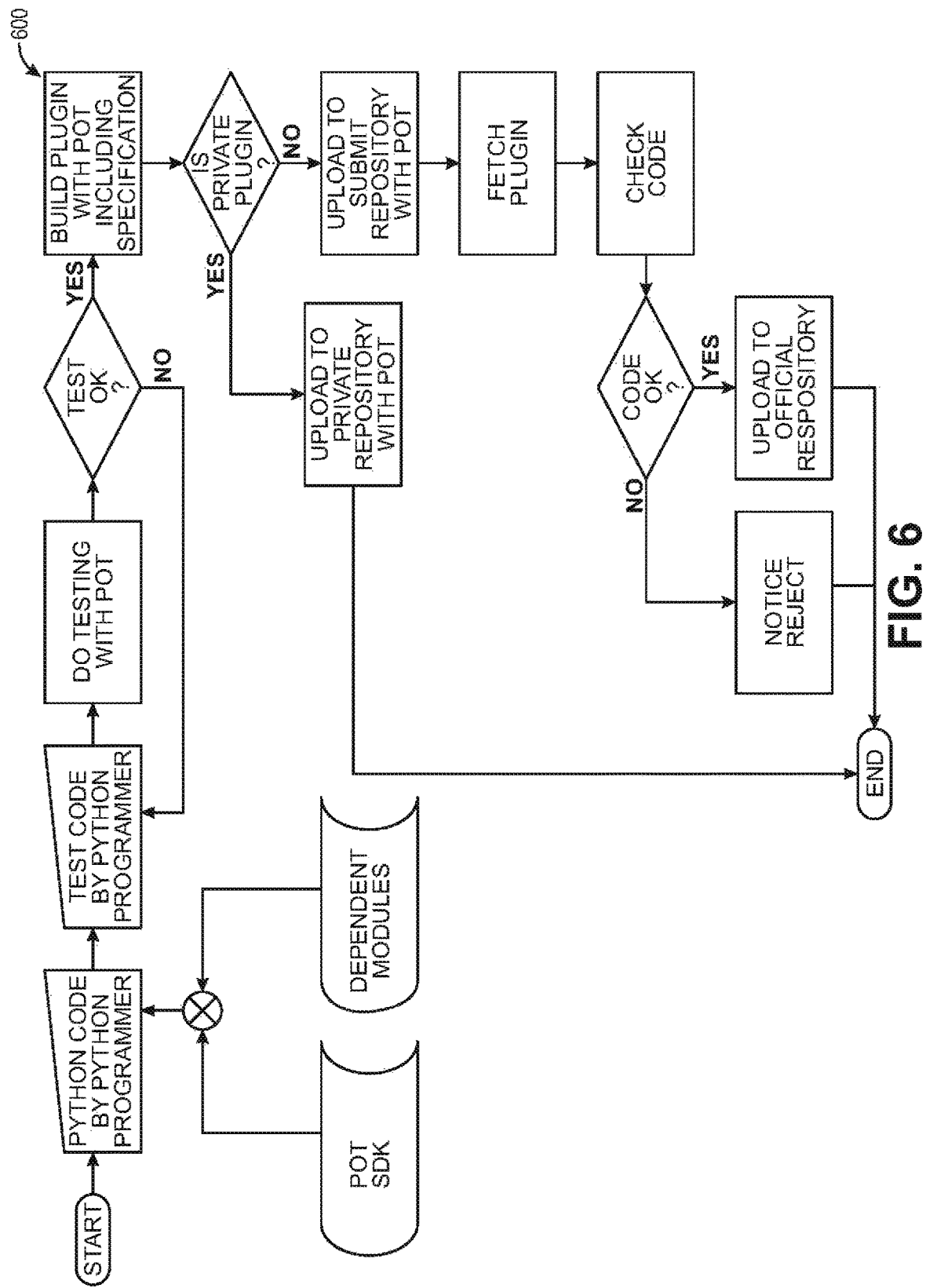
FIG. 6 illustrates an embodiment of a flow diagram for qualifying a plugin module.

FIG. 6 illustrates an embodiment of a flow diagram 600 for qualifying a plugin module. PYTHON code that fits the format requirements of the SDK will be tested by the coder first. Then, after submission to the POT, the code will be again tested by the systems and methods described herein. This double testing also includes checking the code for compliance with STU specifications.

As shown in FIG. 6, the PYTHON coder can choose the plugin to be listed for either public usage or private usage. If the coder chooses the plugin to be private, additional tests will be omitted, and the plugin becomes immediately available to the PYTHON coder from their private repository of plugins. If the coder chooses to make the plugin publicly available, additional qualification processes are performed for security violations. If the plugin satisfies the additional qualification process, the plugin is eventually listed in an official public repository that is accessible by other coders.

In some embodiments, the PYTHON SDK is available to download free of charge to anyone from a website associated with the company that developed the systems and methods described herein. In some embodiments, the PYTHON SDK includes tools that normalize the input/output of plugins made by any PYTHON programmer, thereby allowing multiple plugins created by different programmers to be used with each other sequentially (e.g., back-to-back). The PYTHON SDK may contain, for example, one or more of the following components:

Documentation
Coding templates
Sample Code
ICON building utilities
Packaging tools for submission In some implementations, the packaging tools for submission will help the users double-check items (such as the items below) that are included in the upload package.

Figure 7:
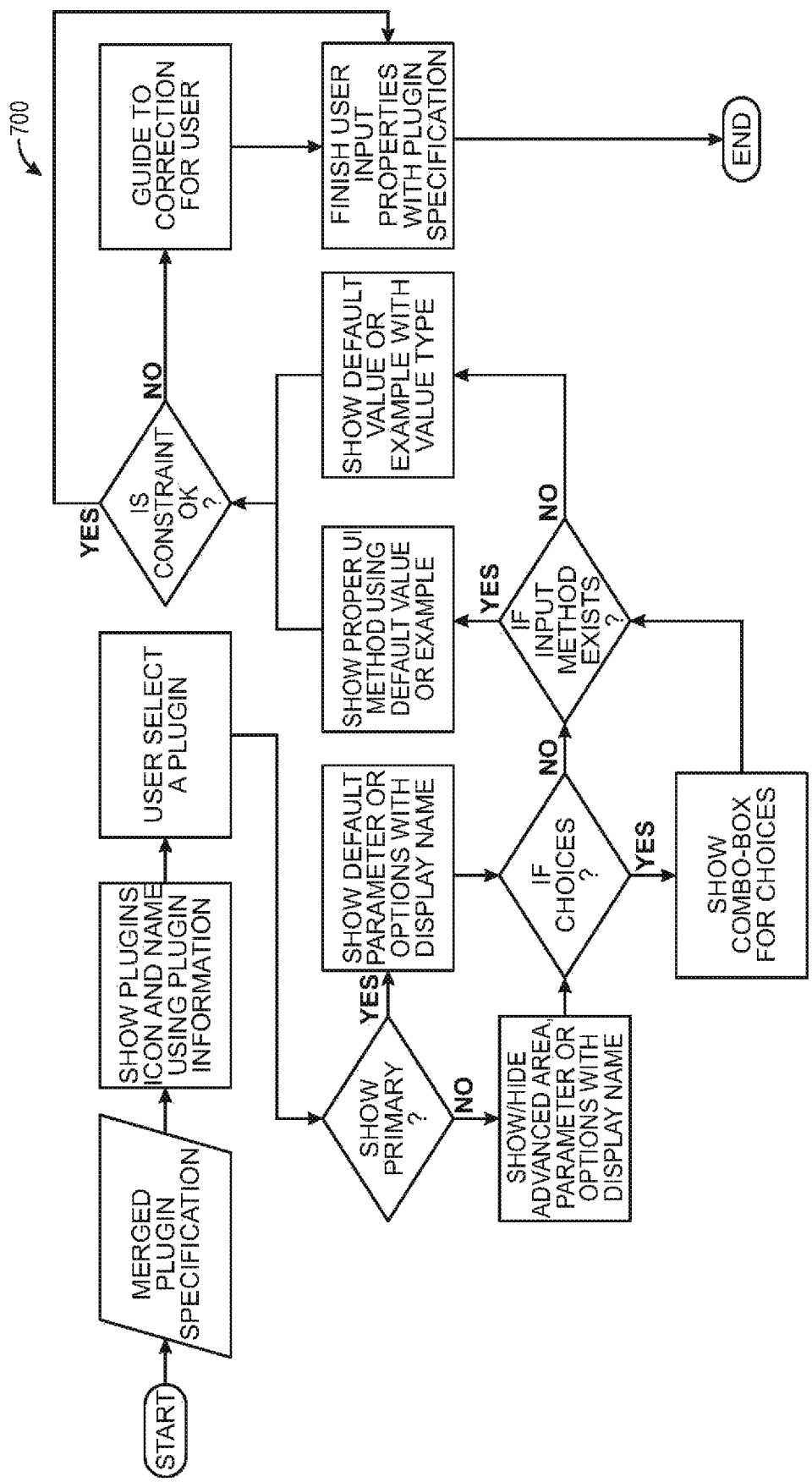
FIG. 7 illustrates an embodiment of a flow diagram for extracting Scenario Studio (STU) specifications from original PYTHON code.

The operational tool attributes may include one or more of the following:

Tool Name and display name
Description
Owner
Group
Version
Icon
Last modified DateTime
Supported Platform (Windows, Linux, Mac, iOS, and Android)
Checksum In some embodiments, parameter attributes may include any one or more of the following:

Parameter name and labels
Options string in case option
Action (store, store true, store false, and append)
Choices (select only from one in the list)
Default value
Help
Input method (password, file/folder read/write, and mouse click)
Input group
Show default or not
Type (string, integer, and float)
Constraint
min_value, max_value, greater, greater_eq, less, less_eq equal, not_equal
regular expression match FIG. 7 illustrates an embodiment of a flow diagram 700 for extracting Scenario Studio (STU) specifications from original PYTHON code. In some embodiments, the STU specification is extracted by parsing a PYTHON program.

One of the essential functions of the POT is to parse or extract specific information from the PYTHON code, which eventually shows as one of the building blocks in STU. FIG. 7 depicts an example of how POT parses a PYTHON program to extract an STU specification. Primarily, the information that becomes the parameter setting sections are extracted from the argument portion of the PYTHON code and processed as STU Specifications. Some implementations of RPA+POT automatically convert the PYTHON code into STU building blocks by analyzing Functions and Arguments and generating Specifications of the STU plugin.

Figure 8:
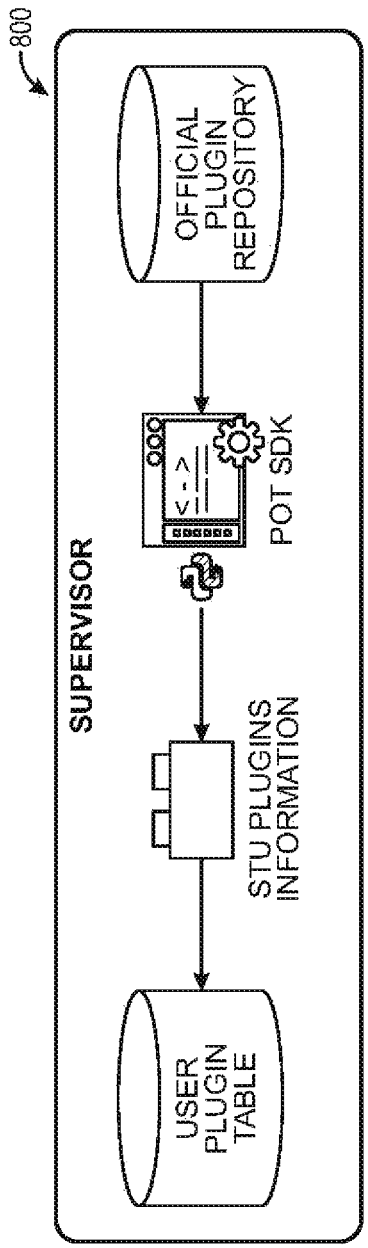
FIG. 8 illustrates an embodiment of a process for making plugin information available.

FIG. 8 illustrates an embodiment of a process 800 for making plugin information available using Supervisor. For example, plugin information may be available through a marketplace, a public repository, or a private repository. In some embodiments, RPA+ has a cloud-based administrative system called Supervisor. The Supervisor also has a set of functionalities to manage the PYTHON plugins from the user's viewpoint.

Users of the described systems and methods can sign in to their Supervisor account to view what plugins are available for them by browsing through the marketplace and the list of private repositories that they are entitled to access. The user can make a purchase of a plugin, which could be a zero-dollar purchase if the plugin is free. Or, the user can access a private repository (or repositories) if they have the privilege to use the plugin tools registered in such private repositories. The Supervisor collects the plugin information via the POT as shown in FIG. 8.

Figure 9:
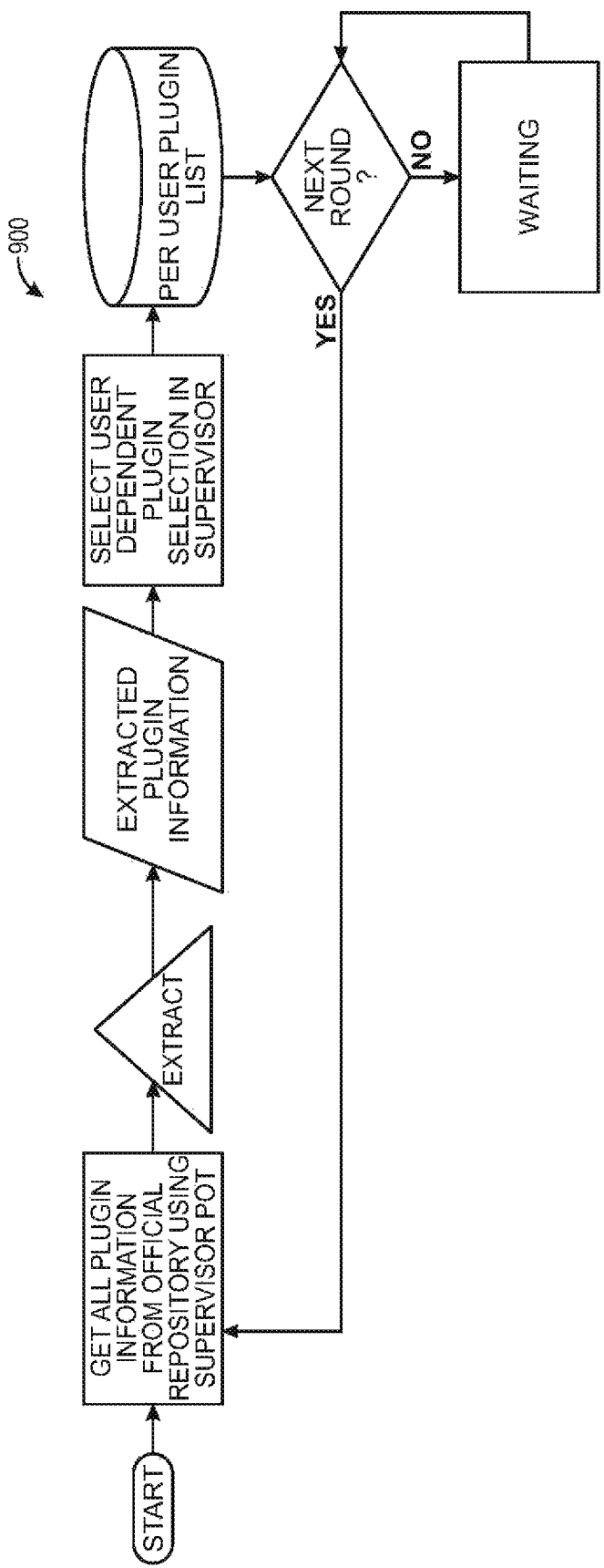
FIG. 9 illustrates an embodiment of a flow diagram for collecting plugin information and presenting the plugin information to a user.

FIG. 9 illustrates an embodiment of a flow diagram 900 for collecting plugin information and presenting the plugin information to a user. For example, the flow diagram shown in FIG. 9 may be managed by the Supervisor. Some implementations of RPA+ prepare both public and private repositories for plugins, thereby enabling PYTHON coders (e.g., plugin builders) to select the availability of the plugins.

Figure 10:
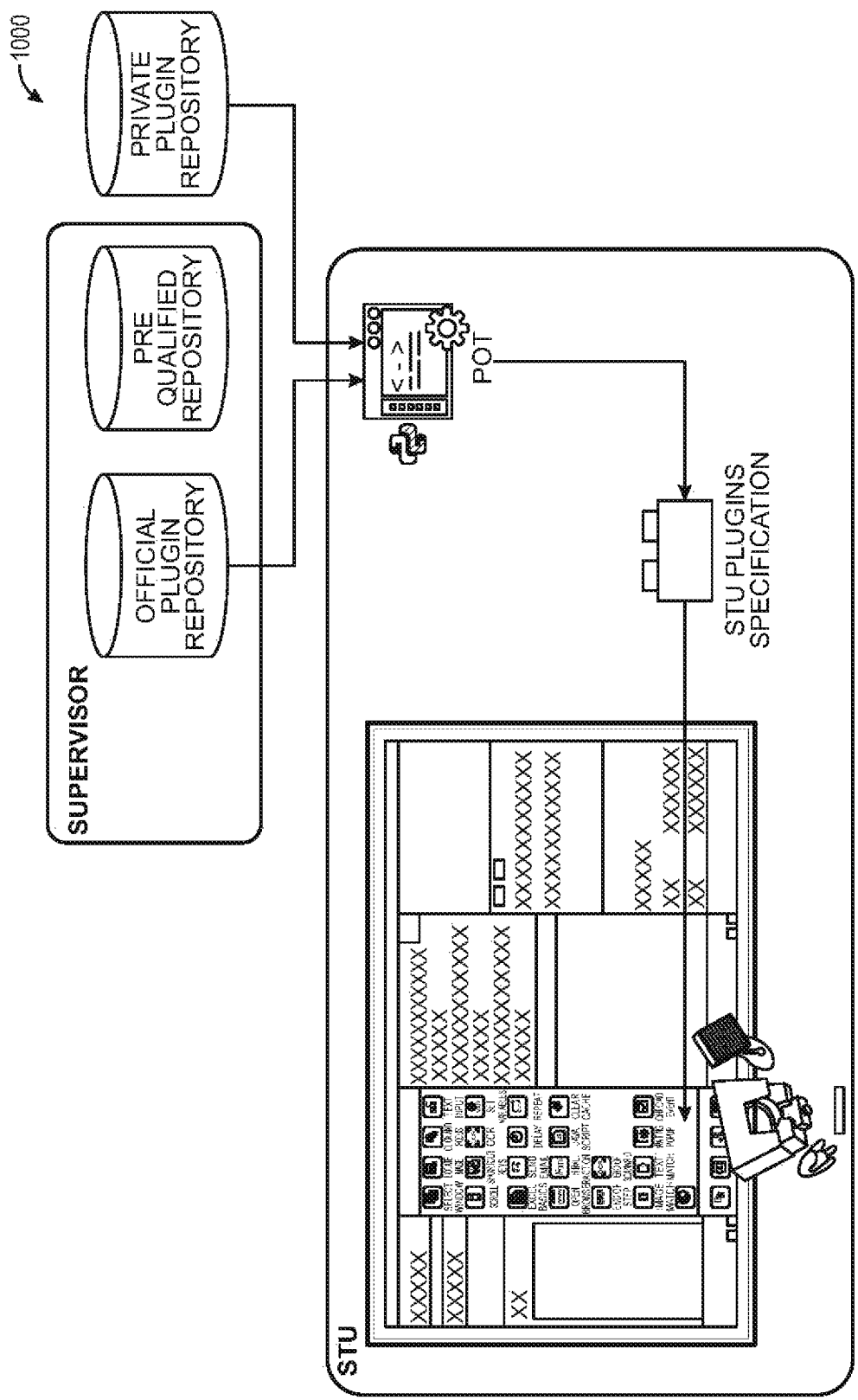
FIG. 10 illustrates an embodiment of a process for obtaining new or updated plugin information.

FIG. 10 illustrates an embodiment of a process 1000 for obtaining new or updated plugin information. When acquiring plugin modules by the STU, the STU may integrate a software tool called a Plugin Package Manager (PPM) that communicates with the Supervisor using the REST API. The PPM also communicates with official or private plugin repositories. Each time the STU starts, the PPM will contact the Supervisor to get a user-dependent plugin list and repository to get the specification of the plugin, which covers both public and private repositories.

Figure 11:
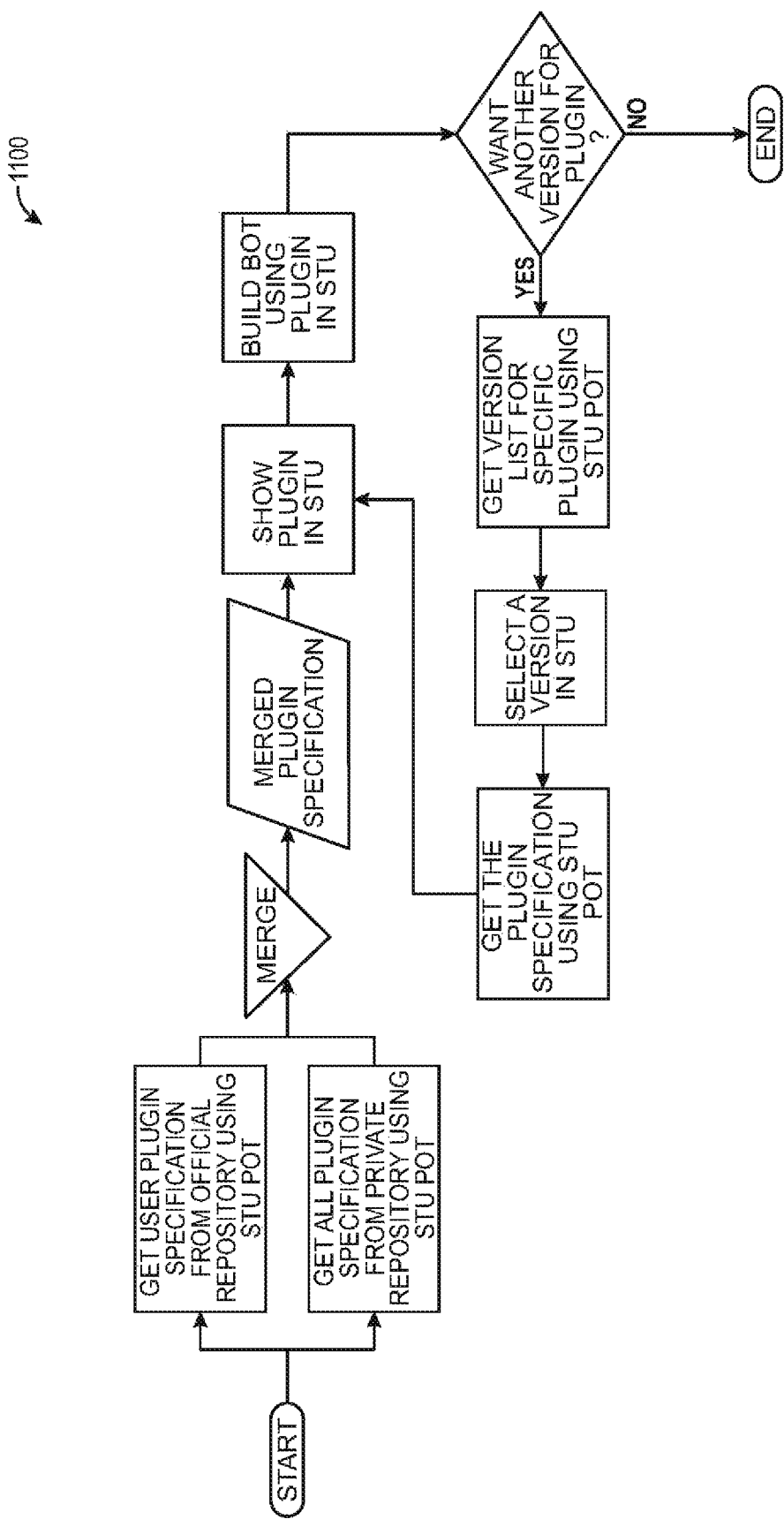
FIG. 11 illustrates an embodiment of a flow diagram for obtaining and updating plugin information.

FIG. 11 illustrates an embodiment of a flow diagram 1100 for obtaining and updating plugin information by the STU.

Figure 12:
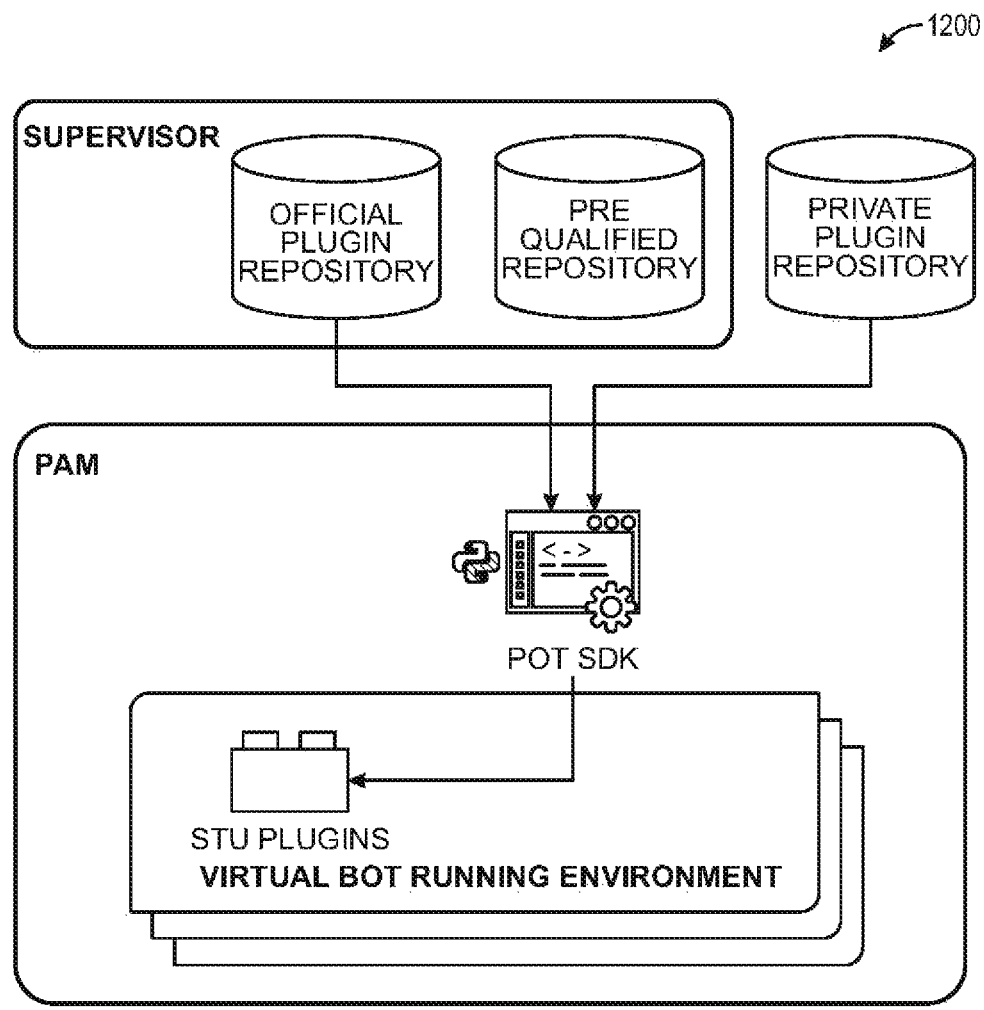
FIG. 12 illustrates an embodiment of a process for retrieving the original PYTHON code from one or more repositories.

FIG. 12 illustrates an embodiment of a process 1200 for retrieving the original PYTHON code from one or more repositories. Once the Bot has been built with plugins, the STU packages the Bot into a file and provides it to the PAM. Then, the PAM uses its own Plugin Package Manager (PPM) to identify the plugins being used in a specific Bot and asks for the plugin package which contains the original PYTHON script. The plugin then gets transmitted to the PAM. The plugin package can come from either the public repository or the private repository. FIG. 12 illustrates this mechanism.

Figure 13:
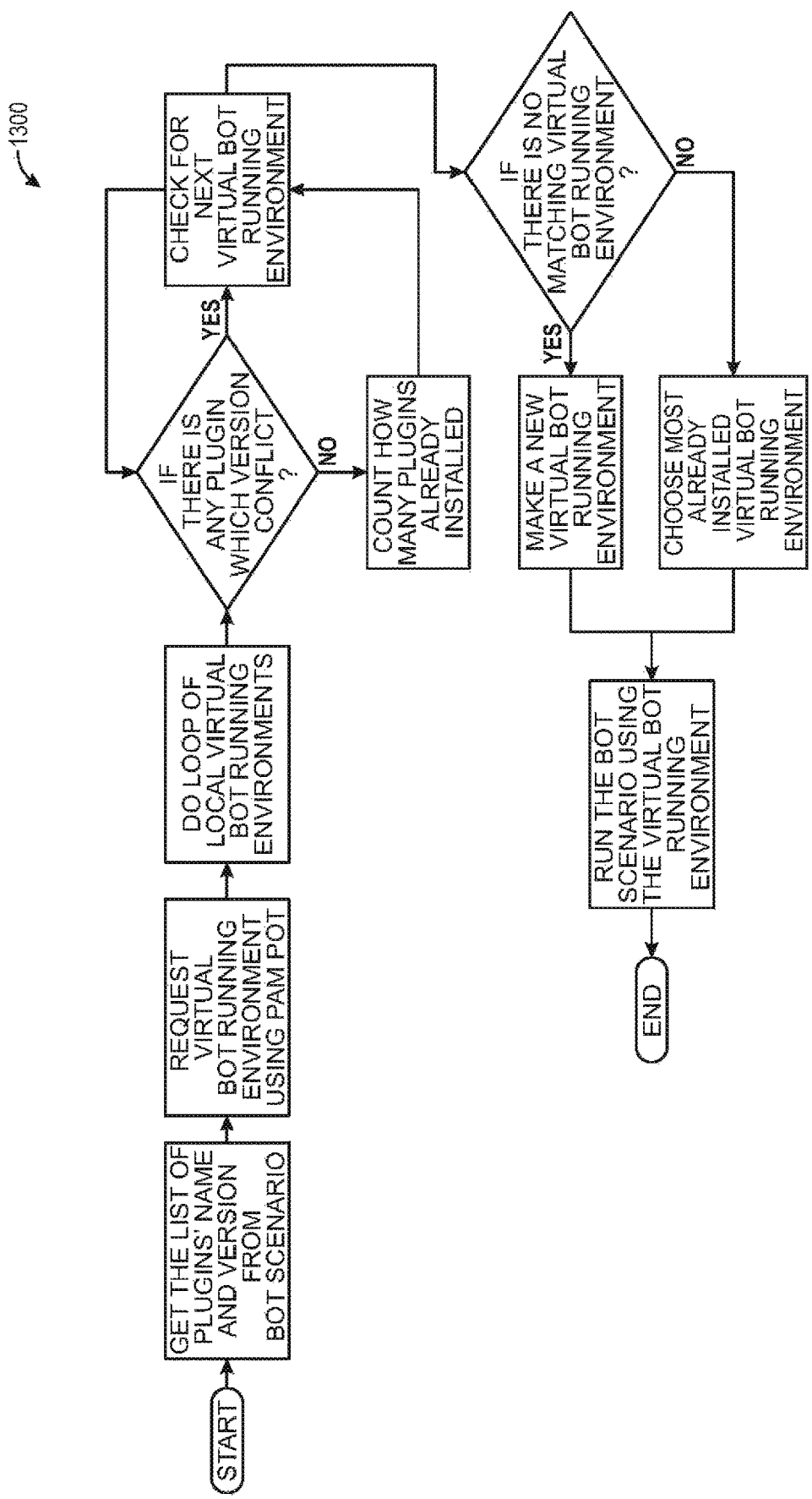
FIG. 13 illustrates an embodiment of a flow diagram for obtaining original PYTHON code for execution.

FIG. 13 illustrates an embodiment of a flow diagram 1300 for obtaining original PYTHON code for execution. In other words, FIG. 13 presents the flow diagram associated with the mechanism illustrated in FIG. 12.

The described systems and methods provide for the governance of Bots with plugins for version control and security management. The PYTHON-based plugin architecture discussed herein makes it possible for RPA+ users to access tens of thousands of functionalities that are already available in the existing PYTHON community. This is a significant benefit of "openness." On the other hand, a risk of the "openness" is managing security and controlling versions. In other words, it is important to ensure the governance of Bots. RPA+ has an architecture to provide this governance. PAM, the Process Automation Module that executes the Bot, has a mechanism to prepare a "sandbox" like environment specific for every single Bot. This is like a virtual device for a Bot, and makes it efficient in executing the automation because the components that are required by the Bot have been prepared in advance. When running the Bot, the PAM checks for the Bot versions and components as well as its authenticity for the builder and the executor. These mechanisms can provide safety measures and management capabilities against accidentally or non-accidentally executing unauthorized Bots in the field.

Furthermore, these mechanisms can solve version mangling problems. For example, suppose you have two Bots: BotA and BotB, both of which have a dependency on the same plugin, PluginC. The problem becomes apparent when the systems and methods start requiring different versions of PluginC. Suppose BotA needs v1.0.0, while BotB requires the newer v2.0.0, for example. Using a sandbox architecture helps mitigate this problem.

The RPA+ is not just an RPA. Instead, it can be considered as another form of evolution in the history of the software development platform. RPA+ brings in one layer of abstraction from PYTHON just like the C languages evolved from the preceding "high level" languages. Connecting RPA with the PYTHON community is a natural development because PYTHON is very much centric to future technologies such as AI/ML and automation. As the term RPA is quickly shifting toward new terms like Intelligent Process Automation, RPA+ has already taken steps forward in the same direction. RPA+ and its PYTHON connection brings scalabilities in five dimensions.

Functionality
Deployment environment
Deployment platform
Deployment Size
Future Proof All of these scalabilities are important in today's software development platform selection by enterprises.

Figure 14:
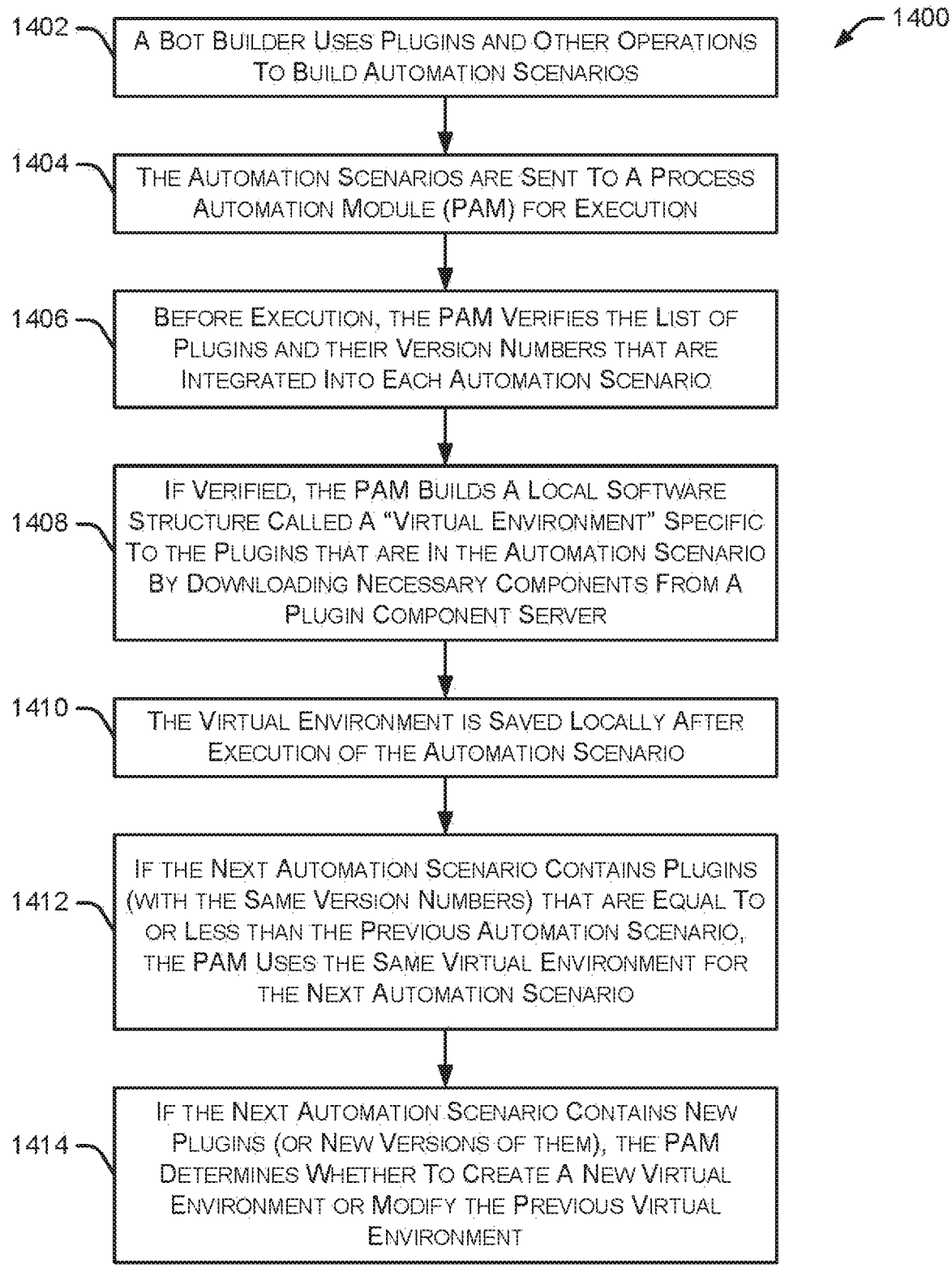
FIG. 14 is a flow diagram illustrating an embodiment of a method for managing a virtual environment.

FIG. 14 is a flow diagram illustrating an embodiment of a method 1400 for managing a virtual environment. After plugins are built by the POT SDK, the plugins appear in the STU toolbox and are available to Bot builders. Method 1400 begins as a Bot builder uses plugins and other operations (as described herein) to build 1402 one or more automation scenarios. The automation scenarios are then sent 1404 to a process automation module (PAM) for execution. Before executing the automation scenarios, the PAM verifies 1406 the list of plugins and their version numbers that are integrated into each automation scenario.

If the automation scenario is verified at 1406, the PAM builds 1408 a local software structure called a "virtual environment" specific to the plugins that are in the automation scenario by downloading necessary components from a plugin component server. In some embodiments, there are two types of components that plugins use. They are referred to as primary components and secondary components. The primary components are stored in an entity's official repository or in a private repository created by the plugin builder (also referred to as a plugin coder). The secondary components are stored in the PYTHON community's official storage server (e.g., called pypi.org). The secondary components are the PYTHON programs that the primary component calls and uses as pre-built functions. These repositories may be stored in any storage system, such as AWS (Amazon Web Services) or other cloud-based systems or services. Private repositories may reside in any location (e.g., local storage devices or online) based on the preference of the plugin builder.

The virtual environment is saved 1410 locally after execution of the automation scenario. Saving the virtual environment locally refers to storing the virtual environment on the computer system of execution (whether physical or virtual). If the next automation scenario contains plugins (with the same version numbers) that are equal to or less than the previous automation scenario, the PAM uses 1412 the same virtual environment for the next automation scenario. However, if the next automation scenario contains new plugins (or new versions of any plugins), the PAM determines 1414 whether to create a new virtual environment or modify the previous virtual environment. As discussed herein, no more than one version of a particular plugin can exist in the same virtual environment. The PAM decides to modify when adding another plugin to an existing virtual environment will satisfy the requirements of the new automation scenario. The PAM creates a new virtual environment when the version number of the existing plugin does not match the newly required plugin versions by the new automation scenario.

Instead of making an individual virtual environment for all automation scenarios, the PAM attempts to minimize the number of virtual environments stored locally by attempting to modify previously created virtual environments. This approach reduces the amount of time spent downloading plugins and other components and reduces the amount of local storage space required by the virtual environments.

When deploying a Bot (automation scenario) is created using STU. Thus, the Bot is an output of STU. The Bot file is provided to the PAM for execution. In some embodiments, STU and the PAM are located in different computing devices. But, in some situations, both STU and the PAM are located in the same computing device. In some implementations, a Bot file contains a list of components that are required to execute the Bot. The plugins are described by plugin name and version number. Since plugins are updated over time, two Bots that use the same plugin can be using different versions of the same plugin depending on when they were built.

The PAM receives the Bot file and reads the list of plugin names and version numbers. The PAM then collects components from, for example, a cloud server and packages the components into a software program called a virtual environment. The PAM then runs the Bot with the virtual environment and the virtual environment is saved locally to the PAM. Typically, different Bots require different sets of components. Thus, the PAM ends up generating multiple virtual environments, but the PAM attempts to keep the number of virtual environments to a minimum, as discussed above with respect to FIG. 14.

FIGS. 15A-15G illustrate an embodiment of a process 1500 for executing a virtual environment management system. In some embodiments, an important rule when working with virtual environments is that each virtual environment can only contain one version of a plugin. Thus, if a particular plugin has multiple available versions (e.g., an original version and an updated version), a specific virtual environment can only contain one version of the plugin.

Figure 15A:
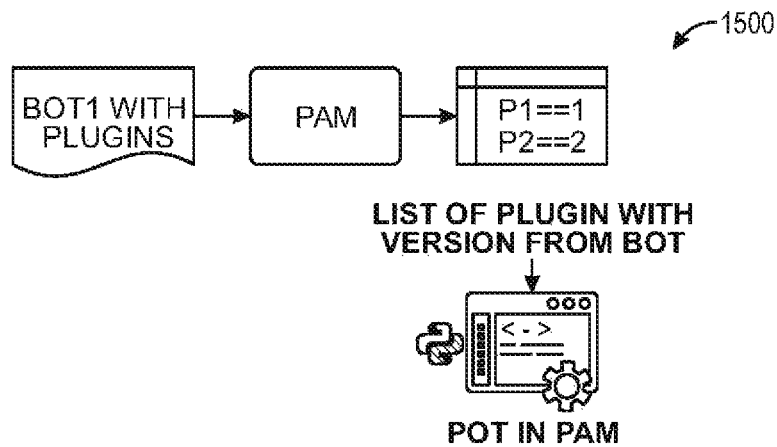
FIGS. 15A-15G illustrate an embodiment of a process for executing a virtual environment management system.
Figure 15B:
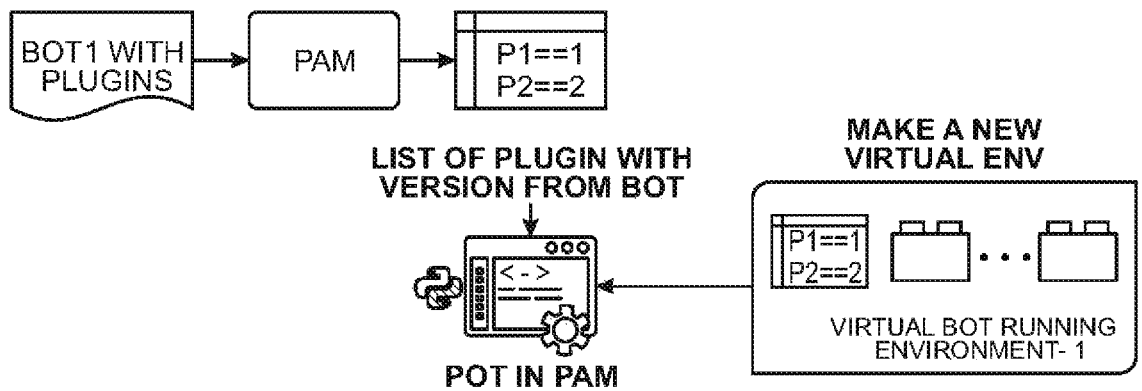

As shown in FIG. 15A, initially there is no virtual environment. In FIG. 15B, the PAM receives its first Bot and reads the list of components in the form of plugin names and plugin version numbers. The PAM also generates a first virtual environment with the required components, and then saves the first virtual environment locally for future use.

Figure 15C:
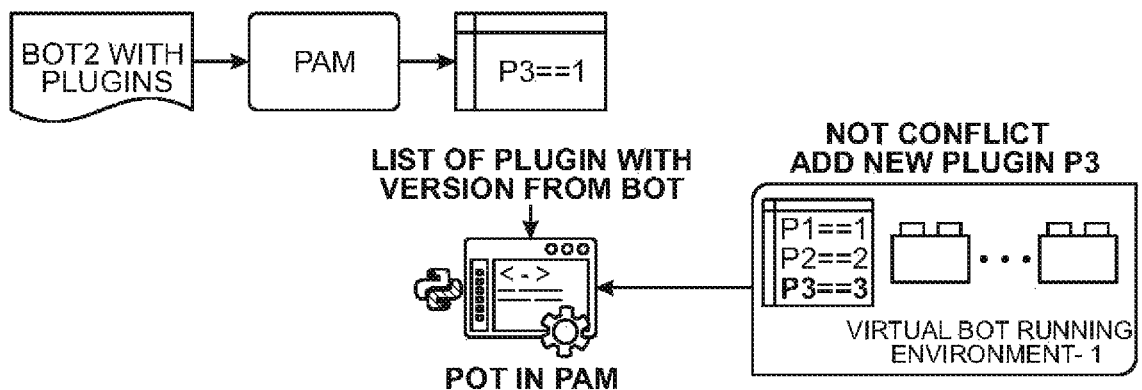

In FIG. 15C, the PAM receives a second Bot and reads the list of components in the form of plugin names and plugin version numbers. The PAM searches the local storage for any existing virtual environments that can serve the second Bot. In this example, the PAM does not find an existing virtual environment that can serve the second Bot (i.e., the first virtual environment). But, the PAM determines that it can add new components to the first virtual environment without disrupting operation of the first Bot. Therefore, the PAM adds the second Bot requirements to the first virtual environment.

Figure 15D:
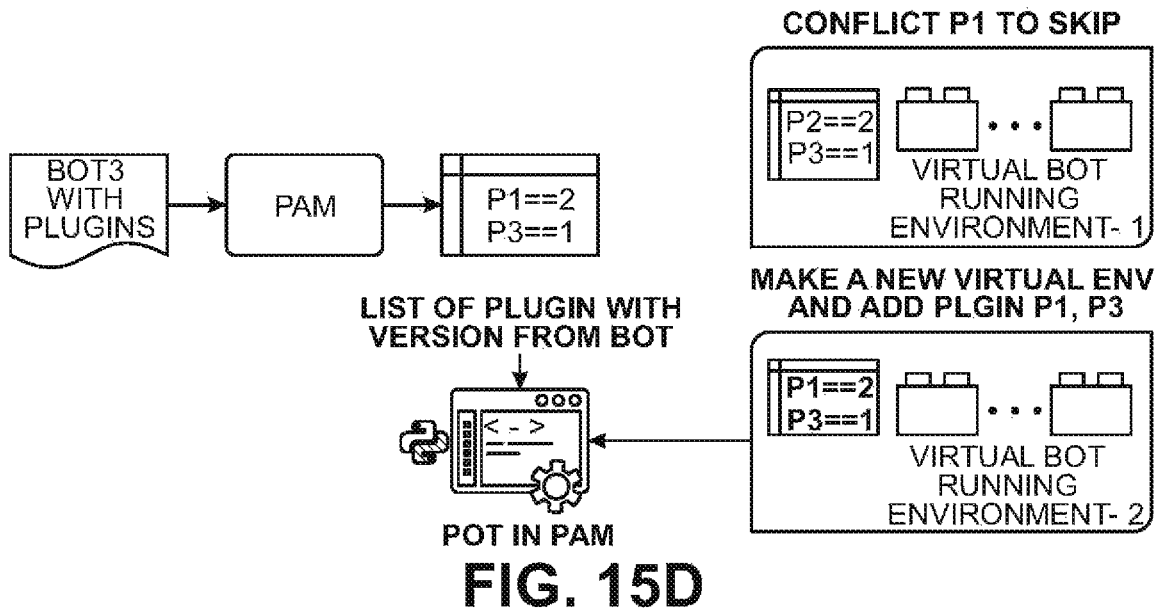

In FIG. 15D, the PAM receives a third Bot and reads the list of components in the form of plugin names and plugin version numbers. The PAM searches the local storage for any existing virtual environments that can serve the third Bot. In this example, the PAM does not find an existing virtual environment that can serve the third Bot. Additionally, the PAM determines that it cannot add new components to the first virtual environment because it would result in two different versions of a plugin in the first virtual environment. Therefore, the PAM generates a second virtual environment for the third Bot with the required components. The PAM then saves the second virtual environment locally for future use.

Figure 15E:
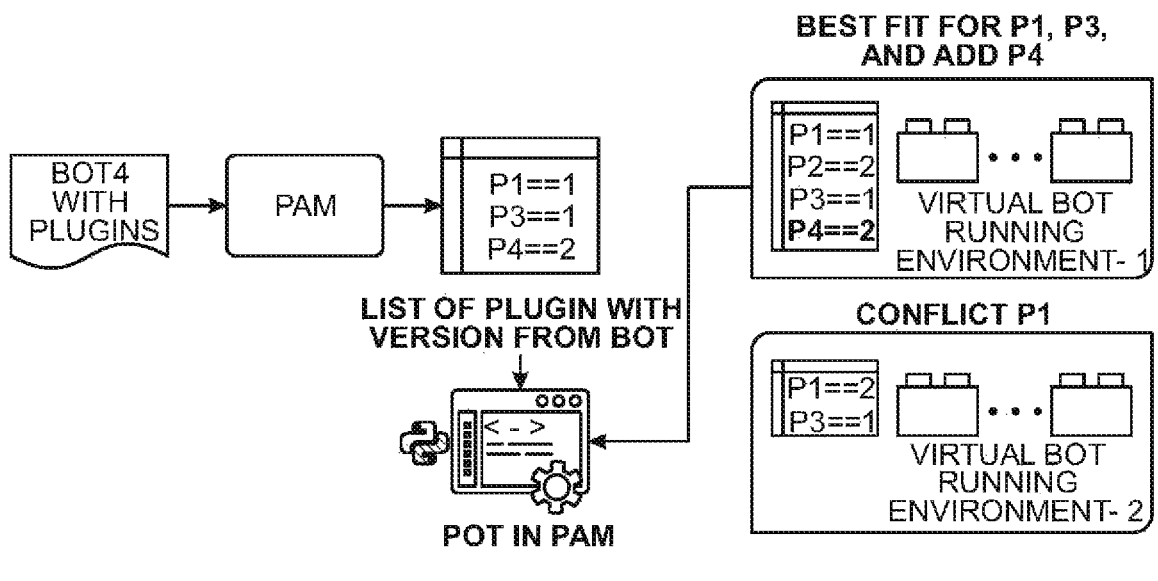

In FIG. 15E, the PAM receives a fourth Bot and reads the list of components in the form of plugin names and plugin version numbers. The PAM searches the local storage for any existing virtual environments that can serve the fourth Bot. In this example, the PAM does not find an existing virtual environment that can serve the fourth Bot. Additionally, the PAM determines that it can add new components to the first virtual environment, which will allow the first virtual environment to support the fourth Bot.

Figure 15F:
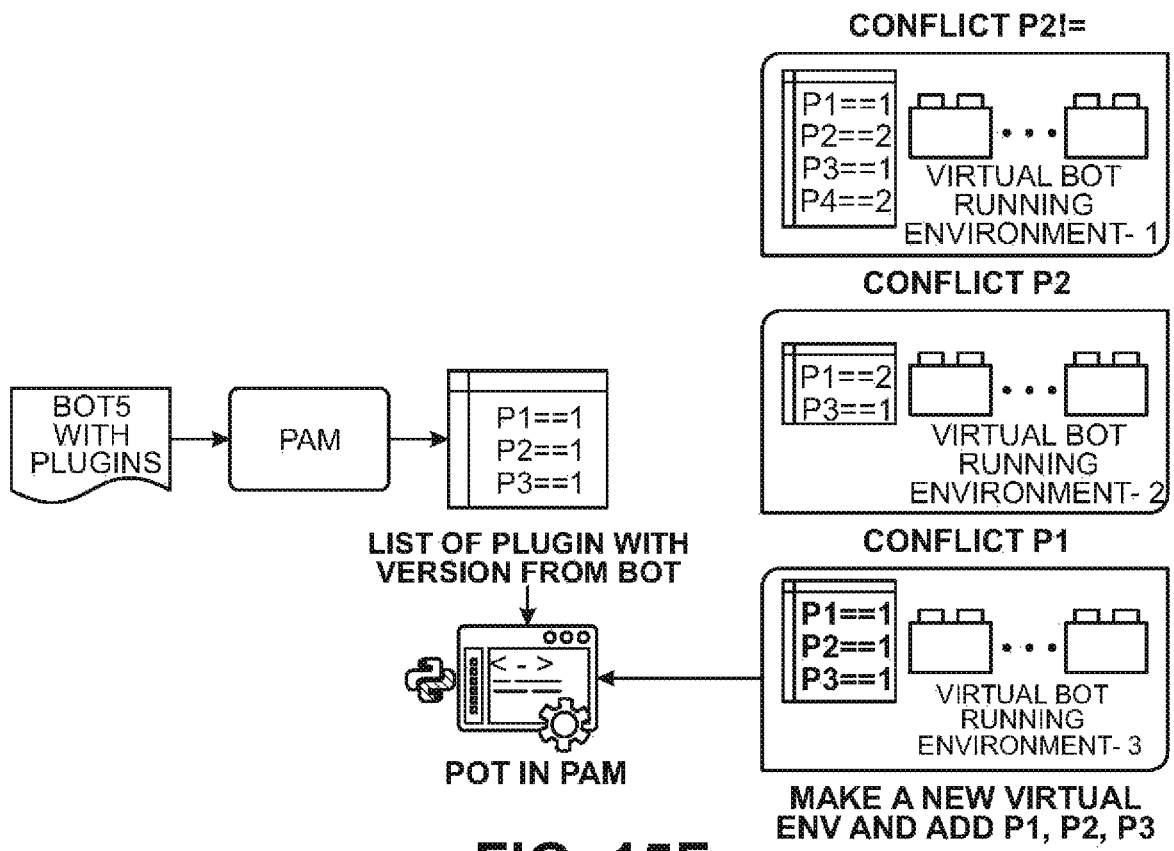

In FIG. 15F, the PAM receives a fifth Bot and reads the list of components in the form of plugin names and plugin version numbers. The PAM searches the local storage for any existing virtual environments that can serve the fifth Bot. In this example, the PAM does not find an existing virtual environment that can serve the fifth Bot. Additionally, the PAM determines that it cannot add new components to the first or second virtual environments because it would result in two different versions of a plugin in the virtual environment. Therefore, the PAM generates a third virtual environment for the fifth Bot with the required components. The PAM then saves the third virtual environment locally for future use.

Figure 15G:
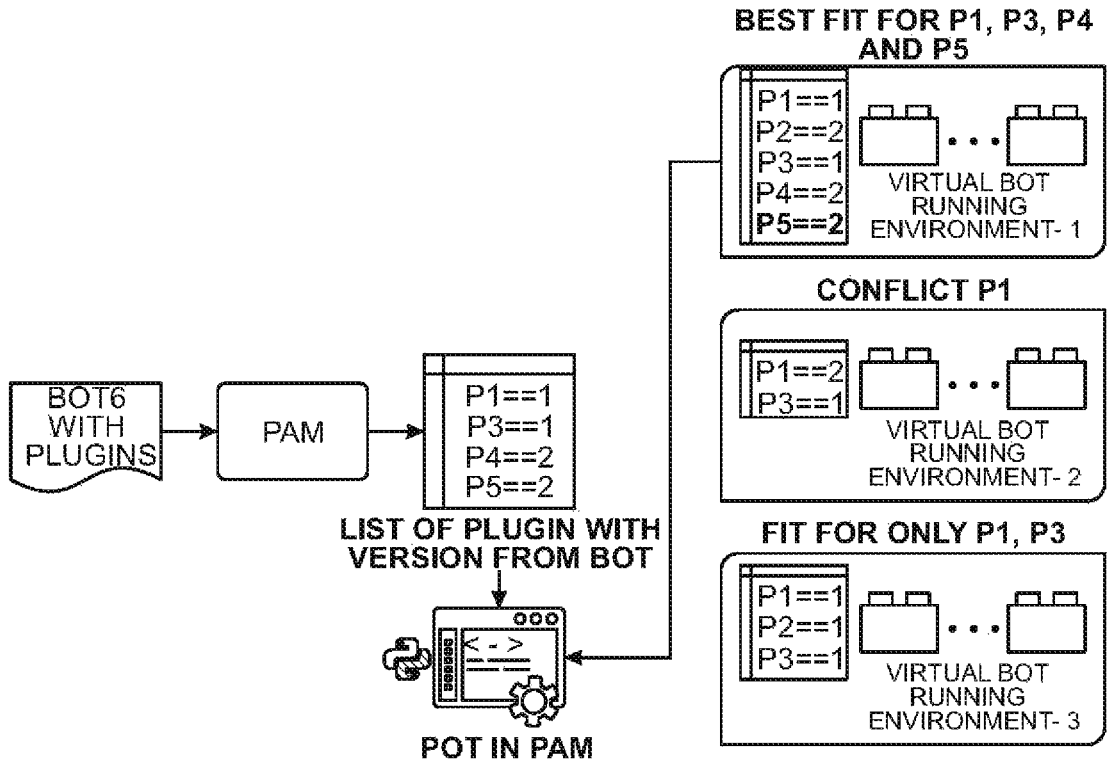

In FIG. 15G, the PAM receives a sixth Bot and reads the list of components in the form of plugin names and plugin version numbers. The PAM searches the local storage for any existing virtual environments that can serve the sixth Bot. In this example, the PAM does not find an existing virtual environment that can serve the sixth Bot. But, the PAM determines that it can add new components to the first virtual environment, which will allow the first virtual environment to support the sixth Bot.

Figure 16:
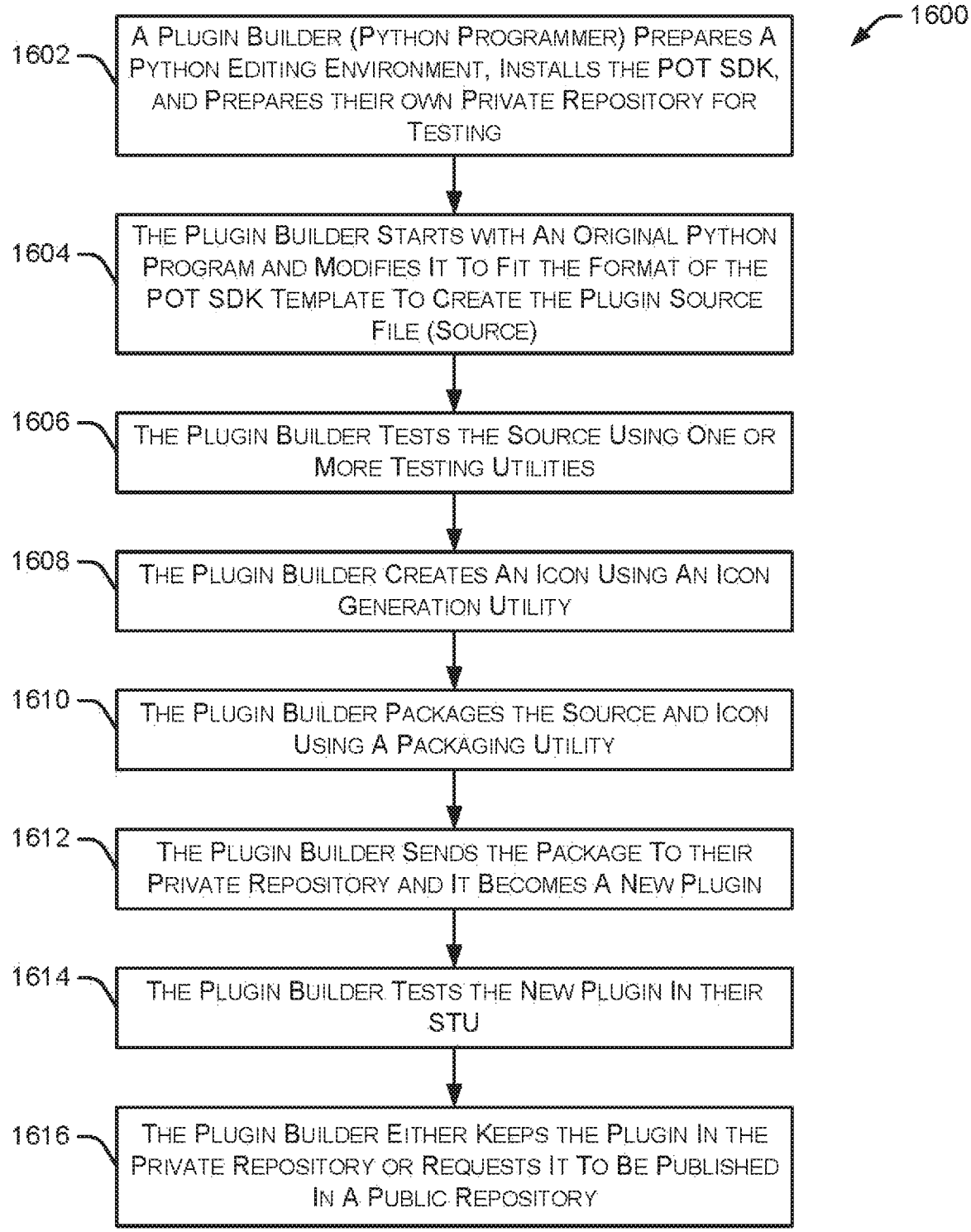
FIG. 16 illustrates an embodiment of a flow diagram for converting PYTHON code into plugins used to build Bots.

FIG. 16 illustrates an embodiment of a flow diagram for converting 1600 PYTHON code into plugins used to build Bots. Initially, a plugin builder (such as a PYTHON programmer or other PYTHON user) prepares 1602 a PYTHON editing environment, installs the POT SDK, and prepares their own private repository for testing. In some embodiments, the POT SDK includes templates, libraries, utilities, and documentation used by the plugin builder. The plugin builder then starts with an original PYTHON program and modifies it 1604 to fit the format of the POT SDK template to create the plugin source file.

The plugin builder then tests 1606 the plugin source file using one or more testing utilities. The plugin builder also creates 1608 an icon using an icon generation utility. The plugin builder then packages 1610 the plugin source file and the icon using a packaging utility. Next, the plugin builder sends 1612 the package to their private repository and it becomes a new plugin. The plugin builder then tests 1614 the new plugin in their STU.

The plugin builder either keeps 1616 the plugin in the private repository or requests that the plugin be published in a public repository, such as a public repository maintained by a company, organization, or other entity. If the private repository is selected, the plugin builder notifies a specific STU and the new plugin will only be available to the designated STU. If the public repository is selected, then the new plugin will be available to all STU users.

Figure 17:
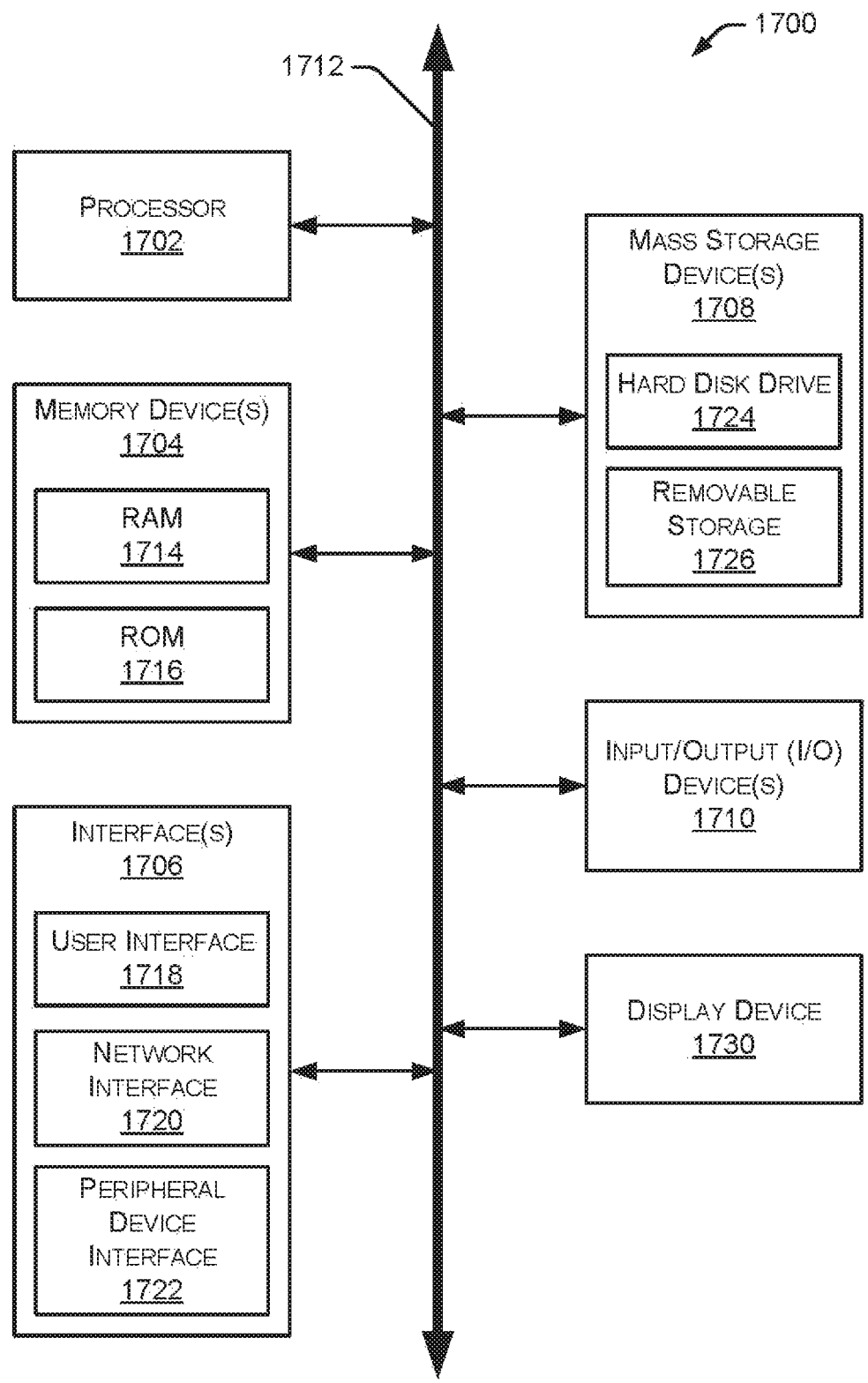
FIG. 17 is a block diagram illustrating an example computing device suitable for implementing the systems and methods described herein.

FIG. 17 is a block diagram illustrating an example computing device 1700 suitable for implementing the systems and methods described herein. The RPA+ system 102, computing systems 104-108, plugin repositories 118 and 120, plugin marketplace 122, PYTHON data source 124, and data source 126 may also have some or all of the attributes of the computing device 1700. In some embodiments, a cluster of computing devices interconnected by a network may be used to implement any one or more components of the invention.

Computing device 1700 may be used to perform various procedures, such as those discussed herein. Computing device 1700 can function as a server, a client, or any other computing entity. Computing device can perform various monitoring functions as discussed herein, and can execute one or more application programs, such as the application programs described herein. Computing device 1700 can be any of a wide variety of computing devices, such as a desktop computer, a notebook computer, a server computer, a handheld computer, tablet computer and the like.

Computing device 1700 includes one or more processor(s) 1702, one or more memory device(s) 1704, one or more interface(s) 1706, one or more mass storage device(s) 1708, one or more Input/Output (I/O) device(s) 1710, and a display device 1730 all of which are coupled to a bus 1712. Processor(s) 1702 include one or more processors or controllers that execute instructions stored in memory device(s) 1704 and/or mass storage device(s) 1708. Processor(s) 1702 may also include various types of computer-readable media, such as cache memory.

Memory device(s) 1704 include various computer-readable media, such as volatile memory (e.g., random access memory (RAM) 1714) and/or nonvolatile memory (e.g., read-only memory (ROM) 1716). Memory device(s) 1704 may also include rewritable ROM, such as Flash memory.

Mass storage device(s) 1708 include various computer readable media, such as magnetic tapes, magnetic disks, optical disks, solid-state memory (e.g., Flash memory), and so forth. As shown in FIG. 17, a particular mass storage device is a hard disk drive 1724. Various drives may also be included in mass storage device(s) 1708 to enable reading from and/or writing to the various computer readable media. Mass storage device(s) 1708 include removable media 1726 and/or non-removable media.

I/O device(s) 1710 include various devices that allow data and/or other information to be input to or retrieved from computing device 1700. Example I/O device(s) 1710 include cursor control devices, keyboards, keypads, microphones, monitors or other display devices, speakers, printers, network interface cards, modems, lenses, CCDs or other image capture devices, and the like.

Display device 1730 includes any type of device capable of displaying information to one or more users of computing device 1700. Examples of display device 1730 include a monitor, display terminal, video projection device, and the like.

Interface(s) 1706 include various interfaces that allow computing device 1700 to interact with other systems, devices, or computing environments. Example interface(s) 1706 include any number of different network interfaces 1720, such as interfaces to local area networks (LANs), wide area networks (WANs), wireless networks, and the Internet. Other interface(s) include user interface 1718 and peripheral device interface 1722. The interface(s) 1706 may also include one or more user interface elements 1718. The interface(s) 1706 may also include one or more peripheral interfaces such as interfaces for printers, pointing devices (mice, track pad, etc.), keyboards, and the like.

Bus 1712 allows processor(s) 1702, memory device(s) 1704, interface(s) 1706, mass storage device(s) 1708, and I/O device(s) 1710 to communicate with one another, as well as other devices or components coupled to bus 1712. Bus 1712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1700, and are executed by processor(s) 1702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   receiving, by a processing system, an automation scenario, wherein the automation scenario is for execution by the processing system;
   identifying, by the processing system, a list of plugins in the automation scenario, wherein each of the plugins in the list of plugins is associated with at least one of a process or an operation;
   identifying, by the processing system, a version number associated with each of the plugins in the automation scenario;
   verifying, by the processing system, the list of plugins and their associated version numbers;
   responsive to verifying the list of plugins and their associated version numbers, building, by the processing system, a virtual environment for executing the plugins in the automation scenario, wherein no more than one version of each plugin in the list of plugins can exist in the virtual environment;
   receiving, by the processing system, a second automation scenario;
   identifying, by the processing system, a list of plugins in the second automation scenario;
   identifying, by the processing system, a version number associated with each of the plugins in the second automation scenario; and
   comparing, by the processing system, the list of plugins in the second automation scenario with the plugins in the virtual environment.

2. The method of claim 1, further comprising:
   downloading the plugins in the list of plugins in the automation scenario from a plugin repository; and
   adding the downloaded plugins to the virtual environment.

3. The method of claim 1, further comprising saving the virtual environment locally on the processing system.

4. The method of claim 1, further comprising executing the automation scenario in the virtual environment.

5. The method of claim 1, further comprising determining, by the processing system, whether any plugins in the second automation scenario have different version numbers than corresponding plugins in the virtual environment.

6. The method of claim 5, further comprising adding the second automation scenario to the virtual environment responsive to determining that no plugins in the second automation scenario have different version numbers than the corresponding plugin in the virtual environment.

7. The method of claim 5, further comprising creating a second virtual environment responsive to determining that at least one plugin in the second automation scenario has a different version number than the corresponding plugin in the virtual environment.

8. The method of claim 1, wherein at least one of the plugins in the list of plugins in the automation scenario is generated by converting a PYTHON program into the plugin using a PYTHON-to-operation tool.

9. An apparatus comprising:
   one or more processors configured to:
      receive an automation scenario, wherein the automation scenario is for execution by the apparatus;
      identify a list of plugins in the automation scenario wherein each of the plugins in the list of plugins is associated with at least one of a process or an operation;
      identify a version number associated with each of the plugins in the automation scenario;
      verify the list of plugins and their associated version numbers;
      responsive to verifying the list of plugins and their associated version numbers, build a virtual environment for executing the plugins in the automation scenario, wherein no more than one version of each plugin in the list of plugins can exist in the virtual environment;
      receive a second automation scenario;
      identify a list of plugins in the second automation scenario;
      identify a version number associated with each of the plugins in the second automation scenario; and
      compare the list of plugins in the second automation scenario with the plugins in the virtual environment.

10. The apparatus of claim 9, wherein the processor is further configured to:
    download the plugins in the list of plugins in the automation scenario from a plugin repository; and
    add the downloaded plugins to the virtual environment.

11. The apparatus of claim 9, wherein the processor is further configured to execute the automation scenario in the virtual environment.

12. The apparatus of claim 9, wherein the processor is further configured to determine whether any plugins in second automation scenario have different version numbers than corresponding plugins in the virtual environment.

13. The apparatus of claim 12, wherein the processor is further configured to add the second automation scenario to the virtual environment responsive to determining that no plugins in the second automation scenario have different version numbers than the corresponding plugin in the virtual environment.

14. The apparatus of claim 12, wherein the processor is further configured to create a second virtual environment responsive to determining that at least one plugin in the second automation scenario has a different version number than the corresponding plugin in the virtual environment.

* * * * *